United States Patent
Pasternak et al.

(10) Patent No.: US 9,266,597 B1
(45) Date of Patent: Feb. 23, 2016

(54) AEROSTRUCTURE FOR RIGID BODY AIRSHIP

(75) Inventors: Igor Pasternak, Los Angeles, CA (US); Eugene Nemirovsky, Whittier, CA (US); Mansoor Kouchak, Stevenson Ranch, CA (US)

(73) Assignee: WORLDWIDE AEROS CORPORATION, Montebello, CA (US)

( * ) Notice: Subject to any disclaimer, the term of this patent is extended or adjusted under 35 U.S.C. 154(b) by 1057 days.

(21) Appl. No.: 13/136,488

(22) Filed: Aug. 1, 2011

(51) Int. Cl.
*B64B 1/08* (2006.01)
*B64B 1/06* (2006.01)

(52) U.S. Cl.
CPC .... *B64B 1/08* (2013.01); *B64B 1/06* (2013.01)

(58) Field of Classification Search
CPC ................ B64B 1/00; B64B 1/08; B64B 1/06
USPC ...................... 244/30, 29, 125, 126, 127, 133
See application file for complete search history.

(56) References Cited

U.S. PATENT DOCUMENTS

| | | | | |
|---|---|---|---|---|
| 1,844,765 A * | 2/1932 | Jackson | ................... | 244/5 |
| 1,862,606 A * | 6/1932 | Peterson | ................... | 244/125 |
| 1,877,956 A * | 9/1932 | Pagon | ................... | 244/125 |
| 1,925,133 A * | 9/1933 | Burgess | ................... | 244/97 |
| 2,083,051 A * | 6/1937 | Chapas | ................... | 244/125 |
| 5,026,003 A * | 6/1991 | Smith | ................... | 244/26 |
| 5,110,070 A * | 5/1992 | Hagenlocher et al. | ................... | 244/125 |
| 5,285,986 A * | 2/1994 | Hagenlocher | ................... | 244/97 |
| 5,823,468 A * | 10/1998 | Bothe | ................... | 244/125 |
| 5,894,703 A * | 4/1999 | Lieb et al. | ................... | 52/651.01 |
| 6,056,240 A * | 5/2000 | Hagenlocher | ................... | 244/125 |
| 6,311,925 B1 * | 11/2001 | Rist | ................... | 244/30 |
| 2008/0179454 A1* | 7/2008 | Balaskovic | ................... | 244/30 |
| 2008/0184653 A1* | 8/2008 | Bauman et al. | ................... | 52/651.01 |
| 2009/0314880 A1* | 12/2009 | Rawdon et al. | ................... | 244/30 |

OTHER PUBLICATIONS

Khoury, Gabriel and Gillett, J. David; Airship Technology (1990); ISBN 0 521 60753 1.
Burgess, Charles; Airship Design (1927); ISBN 0 4102 1173 8.
Blakemore, Thomas and Pagon, W. Watters; Pressure Airships (1927); ISBN 1 4102 0439 1.

* cited by examiner

*Primary Examiner* — Peter M Poon
*Assistant Examiner* — Marc Burgess
(74) *Attorney, Agent, or Firm* — Cislo & Thomas, LLP

(57) ABSTRACT

An airship hull is provided that is sufficiently light and cost effective so as to make lifting body type airships practical vehicles for carrying people and cargo. The present invention hull design includes three main structural features, i.e., a rigid internal main frame which carries all primary moment and shear loads induced in the vehicle, the vehicle's skin which forms a semi-rigid barrier membrane for the lighter-than-air lifting gas, and a rigid aeroshell frame interposed between the main frame and the skin. The aeroshell frame and skin, in combination, are referred to as the aeroshell. The aeroshell carries the aerodynamic pressure loads induced on the airship.

24 Claims, 26 Drawing Sheets

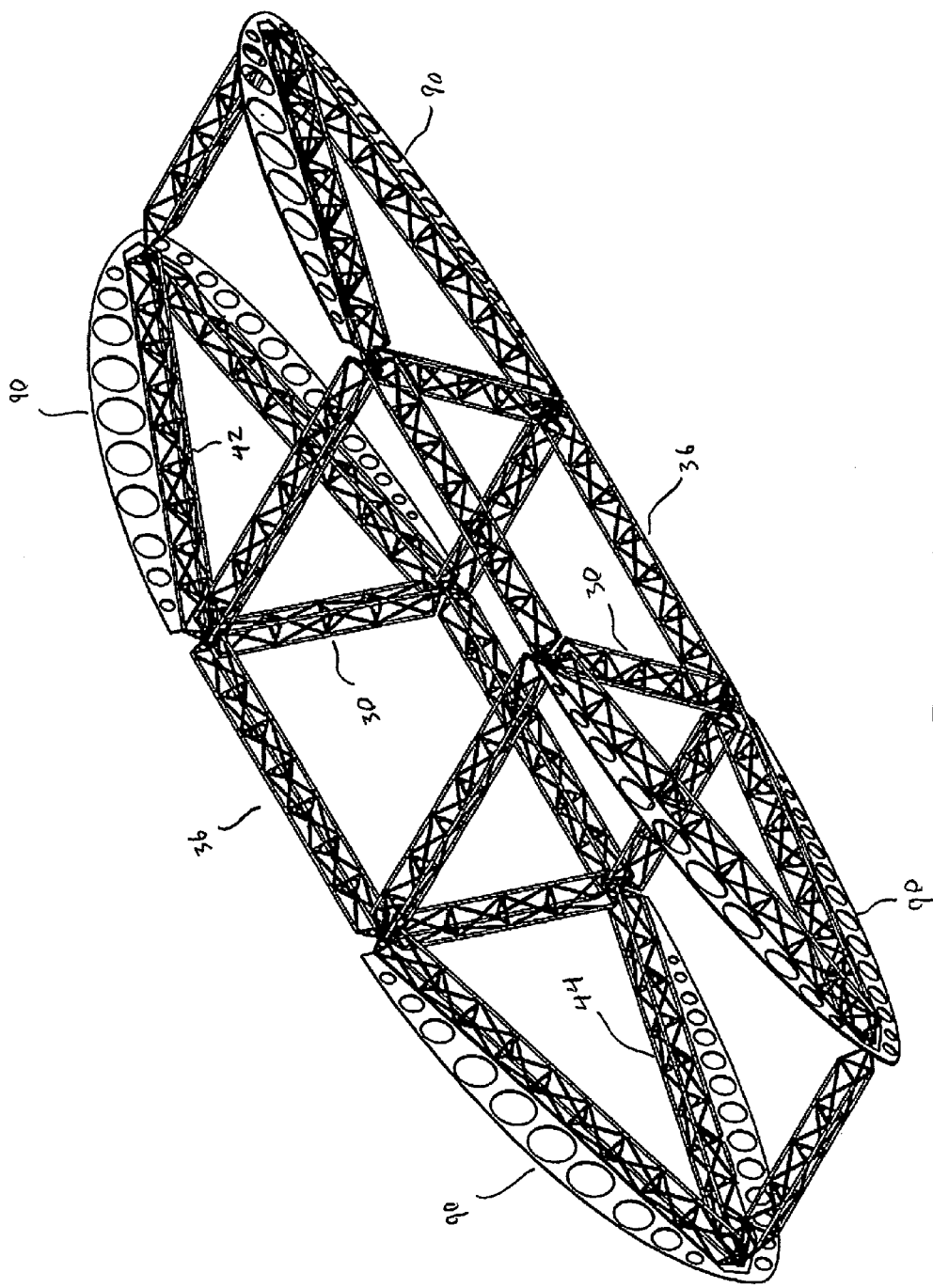

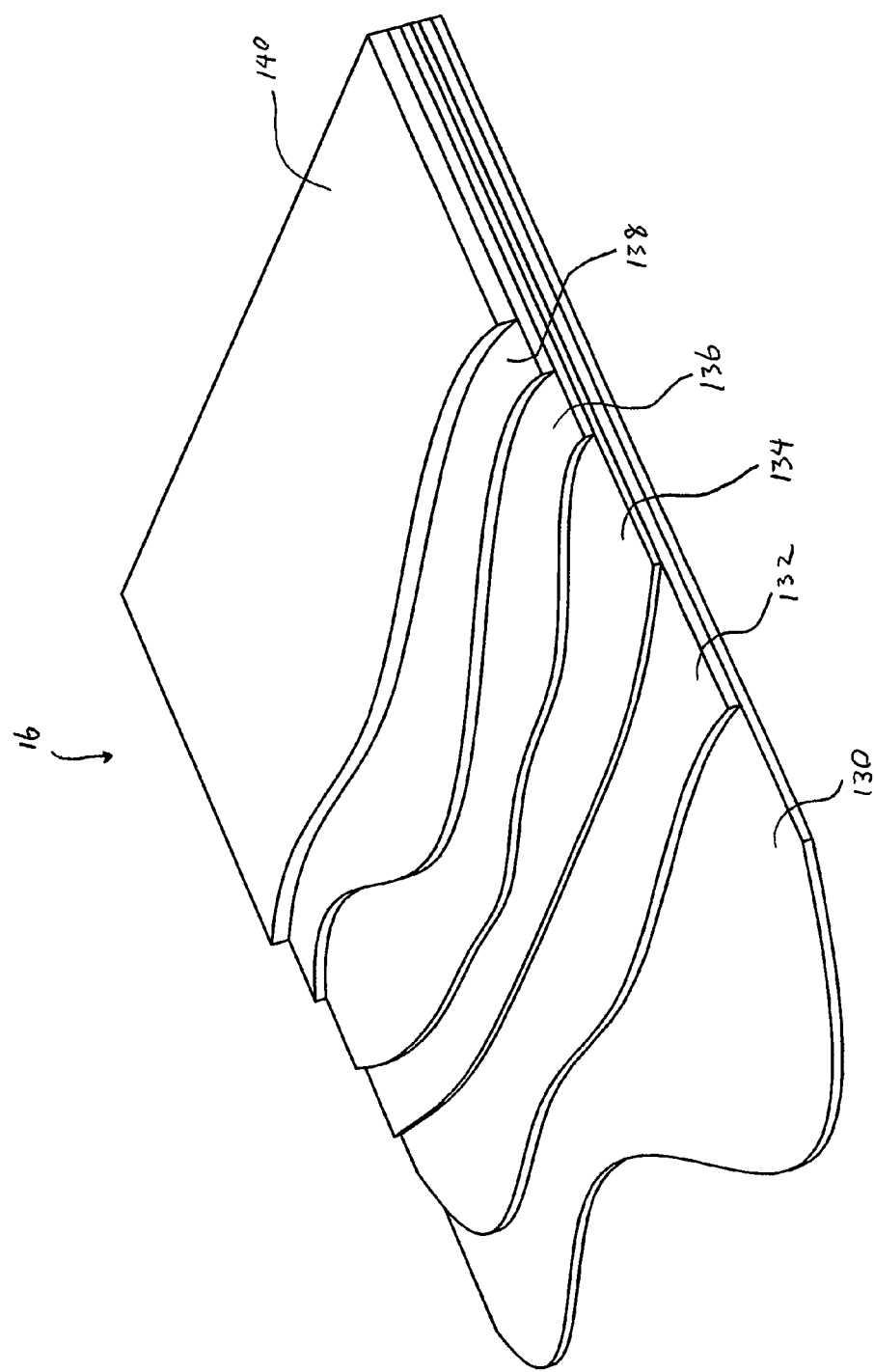

AEROSTRUCTURE FOR RIGID BODY AIRSHIP

BACKGROUND OF THE INVENTION

1. Field of the Invention

The present invention relates generally to the field of airships or buoyant vehicles and, more particularly, to a lightweight, lift producing, airframe and shell structure ("hull") for a rigid body airship. A lift producing hull is highly advantageous because it allows an airship to take off in a statically negative condition, i.e., in a condition where the hull and payload weight exceed the maximum buoyancy supplied by the lifting gas.

2. Background of the Invention

Airships generate buoyant lift by displacing the surrounding air with a hull containing a lighter than air gas. Generally, there are three conventional types of airships, i.e., rigid, semi-rigid, and non-rigid designs. Most commonly, conventional airships have featured a cigar shaped hull, i.e., an elongated hull of circular cross-section. The conventional rigid airship uses a hull having an internal framework supported by multiple gas bags or cells. Similarly, the hull of a semi-rigid airship typically has a stiff internal lower keel for supporting a gondola underneath. A non-rigid airship on the other hand, has no rigid internal structure to support the hull. To maintain hull shape, semi-rigid and non-rigid airships rely upon lifting gas pressure, i.e., the skin of the hull of both types is primarily composed of a fabric material and the lifting gas has a small positive pressure which maintains the hull's shape. Rigid airships have a rigid external skin and therefore do not rely on lifting gas pressure to maintain structural integrity. At least one of each of the aforementioned conventional types of airship has been constructed and flown in the past.

Of the three conventional types of airships, i.e., fully rigid, semi-rigid and non-rigid, all have one salient feature in common, they depend solely upon the buoyancy generated by the lifting gas to create lift. These designs have numerous disadvantages. Conventional semi and non-rigid airships rely on internal pressure to maintain their form and therefore have limited forward airspeed because air pressure loads deform the nose of the hull. Conventional cigar-shaped rigid airships have the disadvantages of excessive weight due to the frame carrying all of the bending moments and aerodynamic loads. A cigar shaped hull is also unable to produce significant aerodynamic lift which further limits the payload capacity of the airship. Moreover, all conventional airships have the disadvantage of requiring ballast for payload exchange and thus require a ground handling crew to ballast the airship upon landing, further limiting utility.

In all types of airship, the hull may be regarded as a beam loaded by various forces which create moment and point loads in the hull. The first of the forces is buoyancy, where buoyancy is achieved by the lift created by the lighter than air lifting gas. Buoyancy introduces a distributed moment load over the hull. Buoyancy forces act upwardly or positively on the airship's hull. Air ship hulls are also affected by downwardly acting forces. These forces comprise the weight of the hull and any components attached to the hull. Of necessity, airships in addition to the weight of the hull include other downwardly acting weights such as engines, cockpits, fuel tanks, ballast, methods for compressing and storing the lifting gas and the like. Each of these weights introduces point loads into the hull and thereby creates a moment distribution across the surface of the hull. The moment distribution across the hull is further affected by the gas pressure bending moment. The gas pressure bending moment is an effect created by the tendency of helium to collect at the top of the hull, above the neutral axis of the hull which thereby introduces a differential in longitudinal loads (or a bending moment) through the hull.

In recent years, a new class of hybrid airships has been proposed. Hybrid airship designs feature a hull in the shape of a lifting body. These designs have the advantage of being able to generate aerodynamic lift in addition to the lift provided by the lifting gas. With the addition of aerodynamic lift, an airship can take off in a statically heavy condition and can thereby carry a heavier payload then would be possible with a conventional non-lifting body hull. Since substantial forward airspeed is need to generate aerodynamic lift, a rigid hull structure is needed to maintain hull shape under the stress imposed by aerodynamic loads. While rigid lifting body or hybrid airships have been proposed, to the inventors' knowledge, no such craft are presently operational. The reason for the lack of a successful lifting body airship is believed to be because aerodynamic lift introduces additional bending moments into the airship's hull which are substantially greater than those of conventional non-lifting body designs. These additional bending moments require a hull structure substantially stronger and hence heavier than that of a conventional rigid airship. Previously proposed rigid, lifting body airships have proposed hull designs incorporating conventional aircraft technology. These hulls however, if built, would likely prove so heavy as to render the designs nonfunctional much less practical for commercial or military use.

In view of the above, there is a need in the art for a hull design for a rigid, lifting body airship, that is light, simple, inexpensive to build and can readily withstand the loads imposed by aerodynamic lift.

SUMMARY OF THE INVENTION

The present invention airship hull solves the problems of the prior art by providing an airship hull in the shape of a lifting body which is sufficiently light and cost effective to assemble so as to create a practical lifting body type airship. The present invention hull design includes three main structural features, i.e., a rigid internal main frame which carries all primary moment and shear loads induced in the vehicle, the vehicle's skin which forms a semi-rigid membrane, and a rigid aeroshell frame interposed between the main frame and the skin. The aeroshell frame and skin, in combination, are referred to as the aeroshell. The aeroshell carries the aerodynamic pressure loads induced on the airship. In one embodiment of the present invention, the skin also functions as the lifting gas container of the airship and thus also carries hoop tension created by positive helium pressure.

The aeroshell is the primary rigid pressure shell structure of the present invention airship hull and is connected at multiple points to the internal main frame. The aeroshell represents the major external frame of the vehicle. It defines the outer shape of the vehicle and is structurally responsible for aerodynamic loads. The internal main frame serves as the main load supporting structure of the vehicle and is structurally capable of handling large bending moment. The main frame is essentially a uniquely designed internal truss system. The skin of the aeroshell, also referred to as the envelope, may also act as a lifting gas container in one embodiment of the airship. Alternatively, gas cells or bags may be contained with the hull.

BRIEF DESCRIPTION OF THE DRAWINGS

FIG. 8 further depicts the attachment of the aeroshell ribs to the main frame in the area between the bulkheads of the main frame.

FIG. 16 is perspective view of the main frame of the airship hull of FIG. 6, showing the areroshell formers in place.

FIG. 24 is a view of the skin of the airship hull of FIG. 4, showing the layers which make up the skin.

DETAILED DESCRIPTION OF THE EXEMPLARY EMBODIMENT

The present invention will now be described more fully hereinafter with reference in the accompanying drawings to the exemplary embodiment. The exemplary embodiment in this instance refers to a prototype airship hull developed by Worldwide Aeros Corp. and constructed by Aeros Aeronautical Systems Corp. both of Montebello, Calif. The invention may, however, may be embodied in many different forms and should not be construed as being limited to the prototype embodiment set forth herein. Rather the prototype embodiment is provided so that this disclosure will be thorough and complete, and will fully convey the scope of the invention to those skilled in the art. Like numbers refer to like elements throughout.

Figure 1:
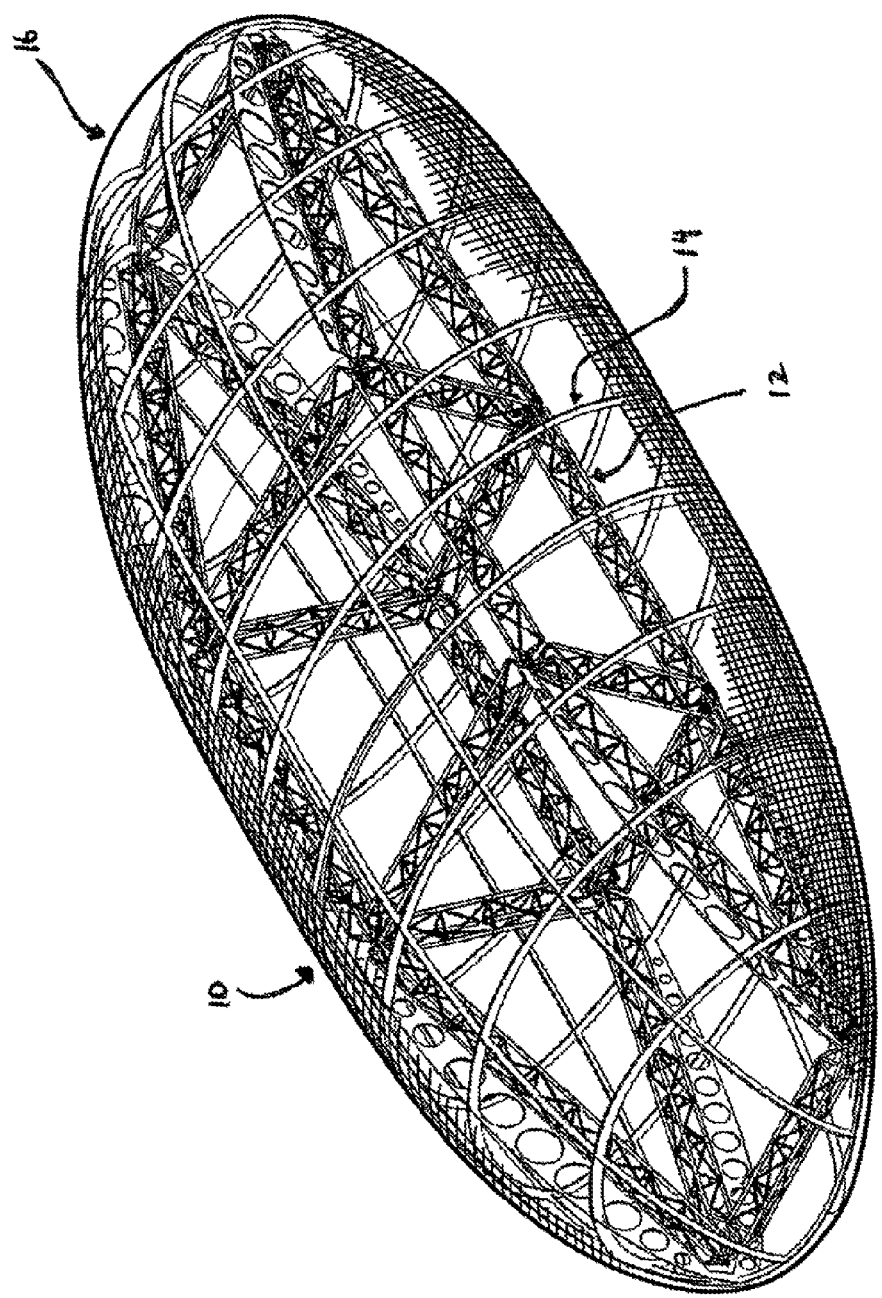
FIG. 1 is perspective view of the airship hull of the present invention showing the hull's internal main frame, and the aeroshell comprised of the aeroshell frame and exterior skin.
Figure 2:
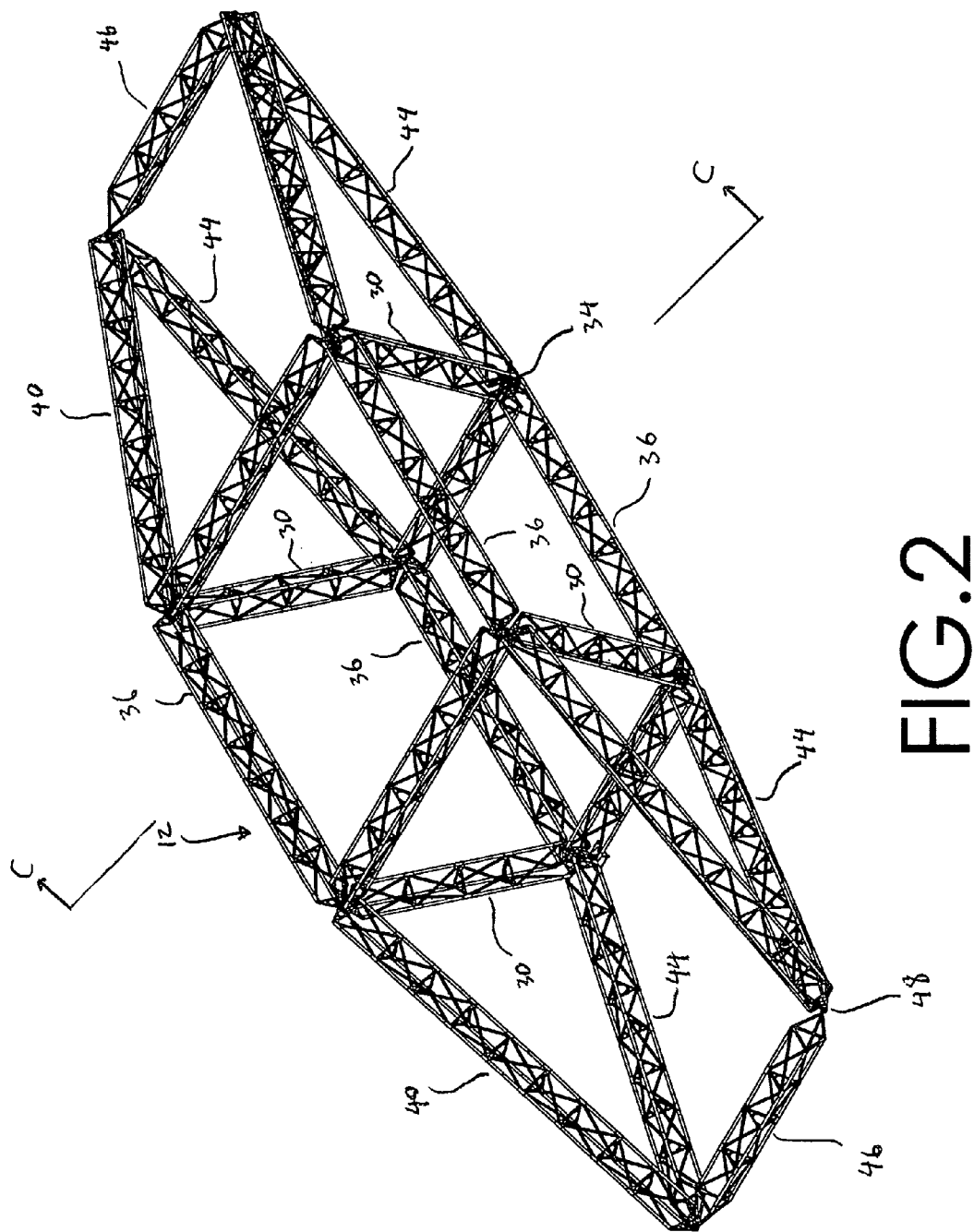
FIG. 2 is perspective view of the main frame of the airship hull of FIG. 1, with the tension cables removed.
Figure 3:
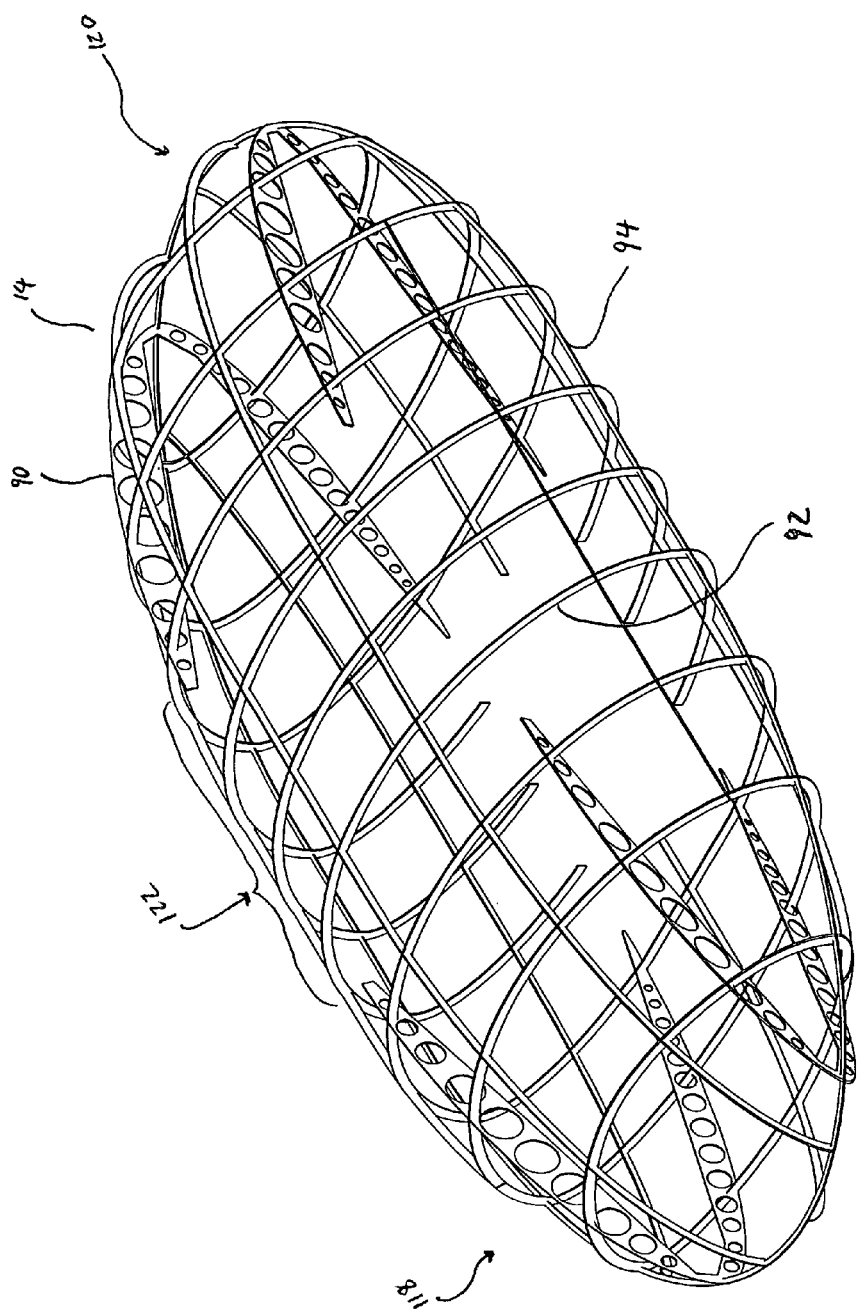
FIG. 3 is perspective view of the aeroshell frame of the airship hull of FIG. 1.
Figure 4:
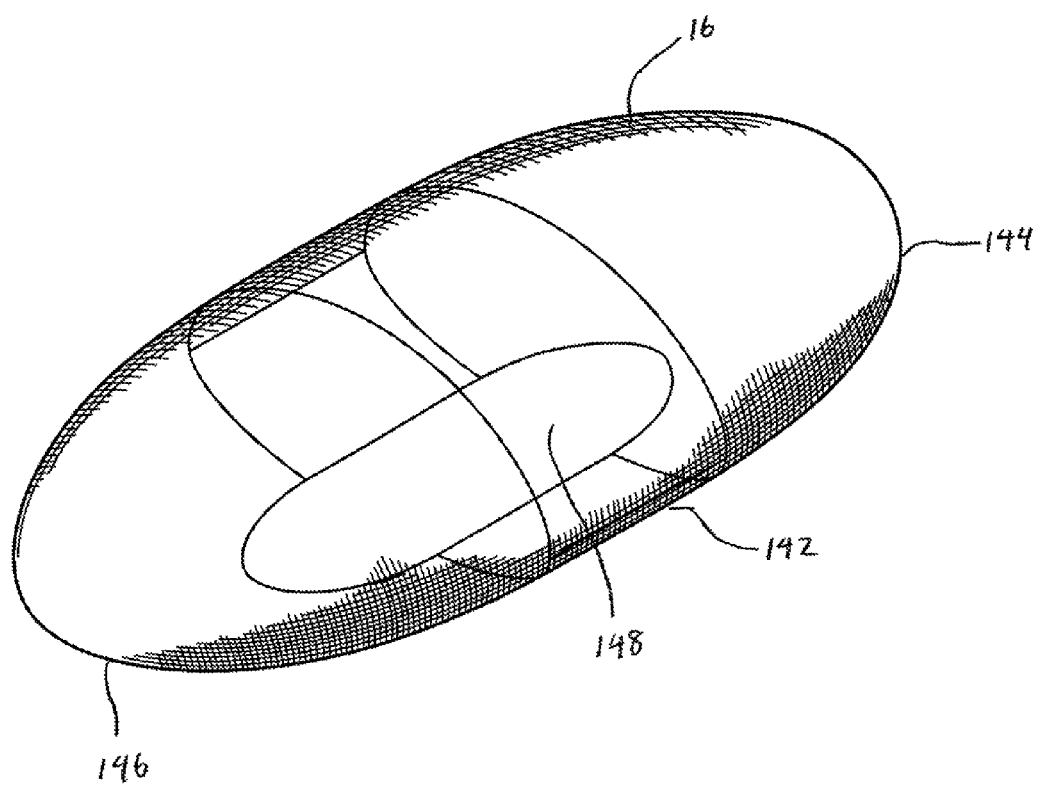
FIG. 4 is a perspective view of the skin of the airship hull of FIG. 1.
Figure 5:
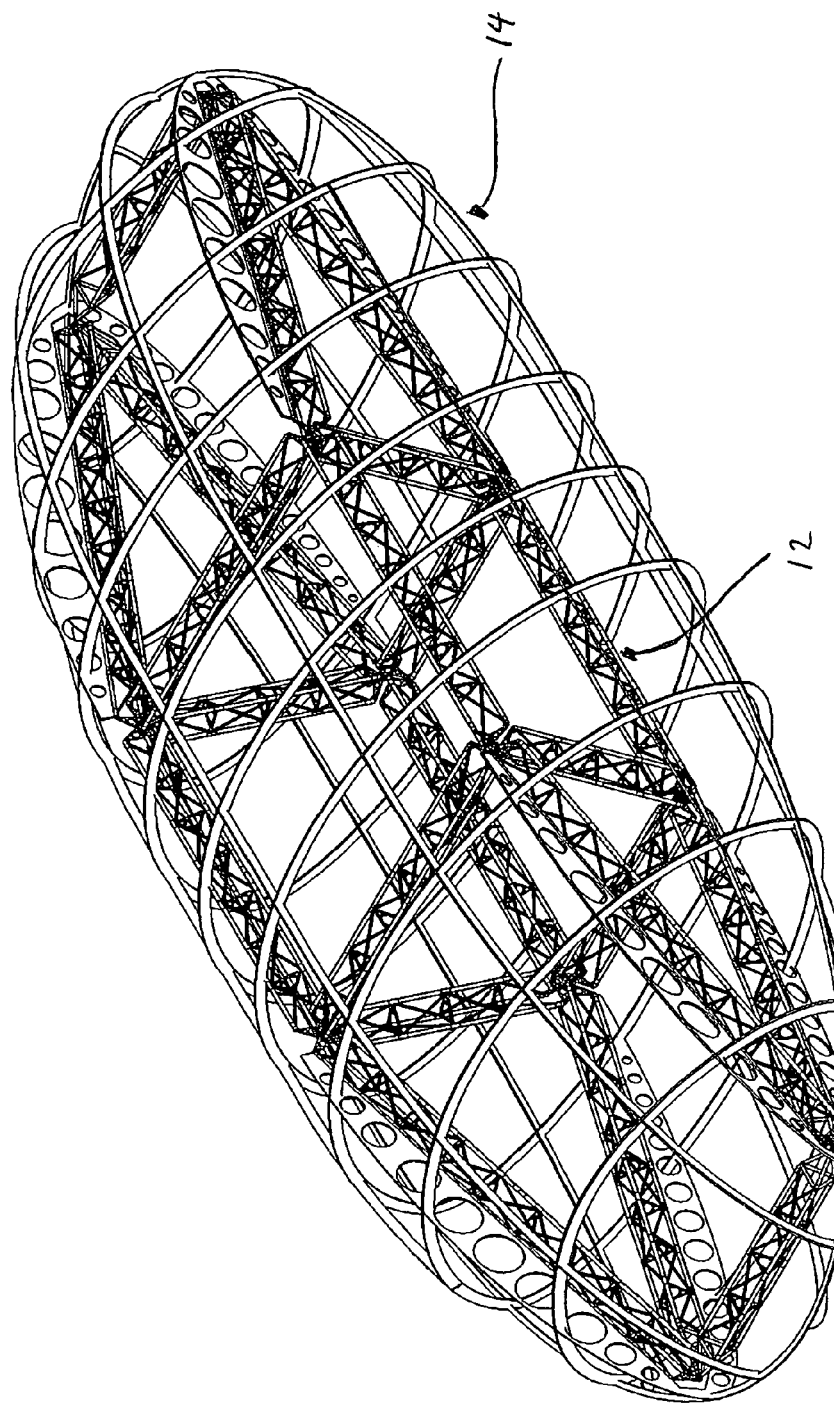
FIG. 5 is perspective view of the airship hull of FIG. 1, with tension cables and the outer skin removed.
Figure 6:
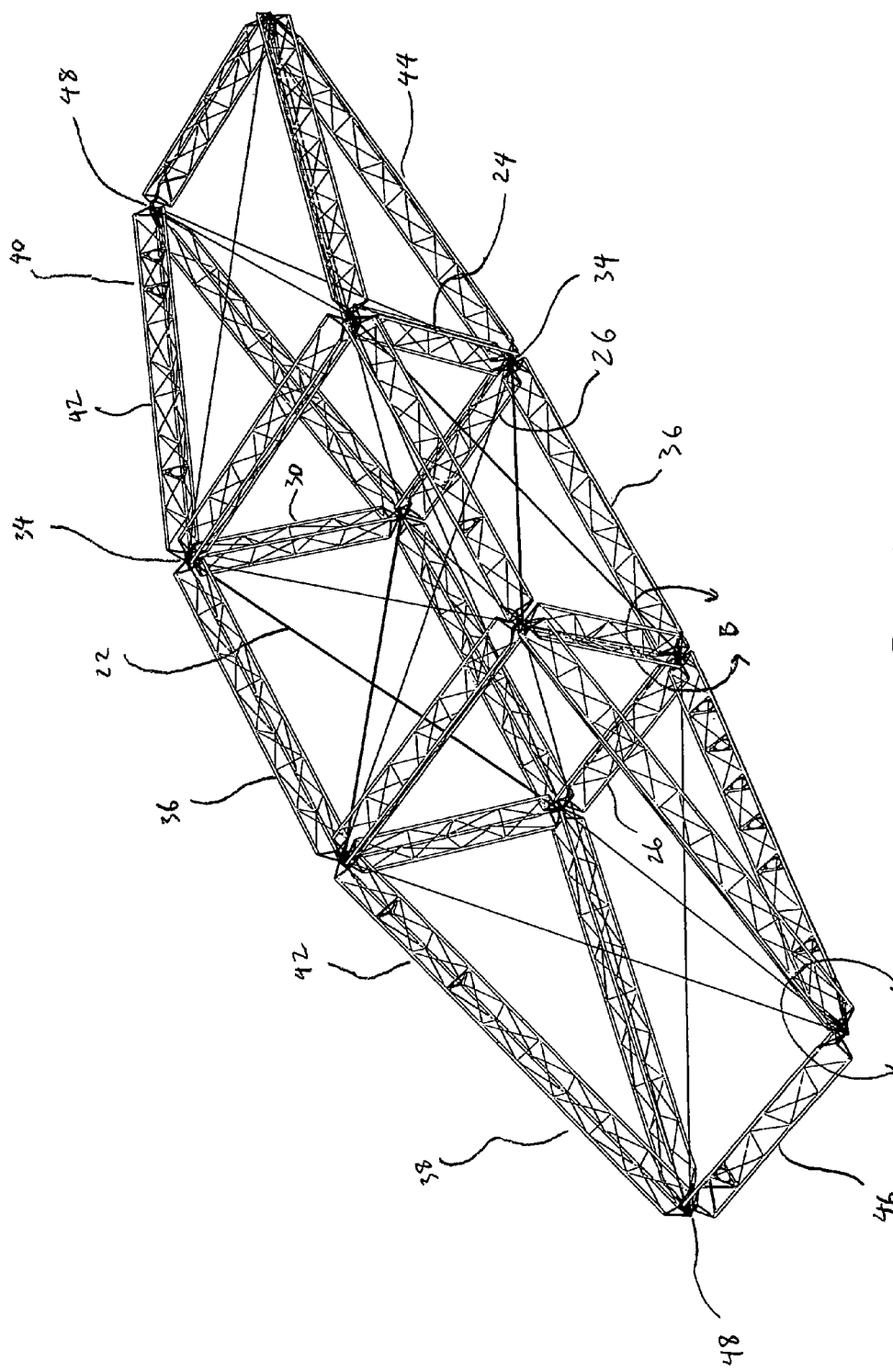
FIG. 6 is perspective view of the internal frame of the airship hull of FIG. 1 with the frame's tension cables in place.

Referring now to FIGS. 1-6, FIG. 1 shows the airship hull 10 of the present invention. FIG. 2 depicts the internal or main frame assembly 12 of the airship hull 10. FIG. 3 depicts the aeroshell frame assembly 14 and FIG. 4 depicts the skin assembly 16 of the hull 10. The skin 16 and the aeroshell frame 14 combined are referred to as the aeroshell 18 (see FIG. 4A). FIG. 5 depicts the internal main frame 12 and the aeroshell frame 14 with the skin 16 removed. FIG. 6 depicts the internal main frame 12 with the aeroshell frame 14 and skin 16 removed.

Main Frame

Figure 7:
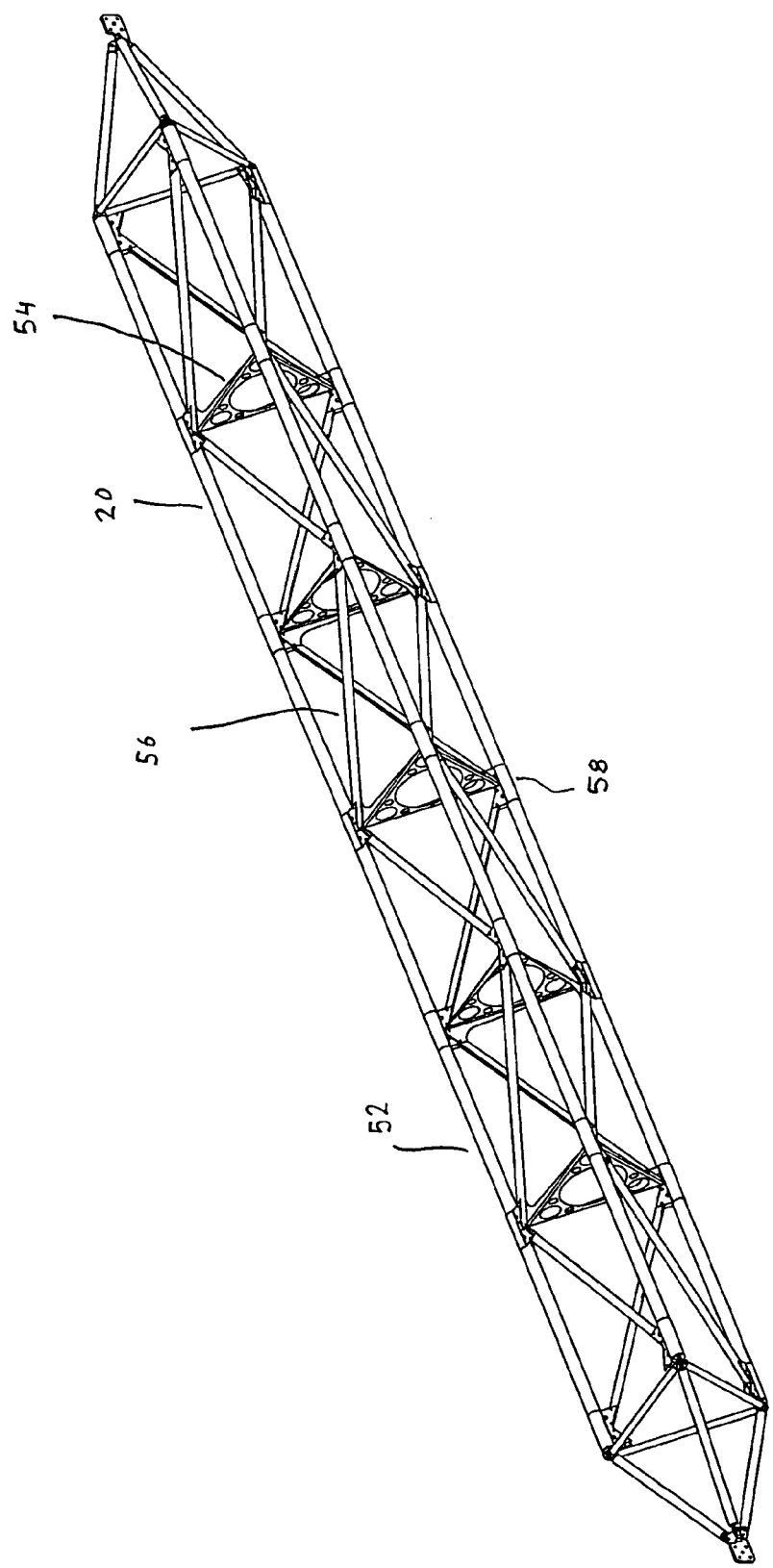
FIG. 7 is perspective view of a typical truss assembly which, along with other truss assemblies make up the internal frame of the airship hull of FIG. 1.

Referring now to FIGS. 6 and 7, the internal or internal main frame 12 serves as the main load supporting structure of the vehicle. The internal main frame 12 is structurally capable of carrying large bending moments. The internal main frame 12 is a uniquely designed internal truss system comprised of multiple truss assemblies 20. The internal main frame 12 is designed to support a variety of loads transferred from aeroshell frame 14 and skin 16. The internal main frame is reinforced with multiple tension cables 22. The internal main frame 12 provides a convenient design approach for the support of engines, canards, empennage structures, cockpit, propulsion system, and other auxiliary systems.

Figure 11:
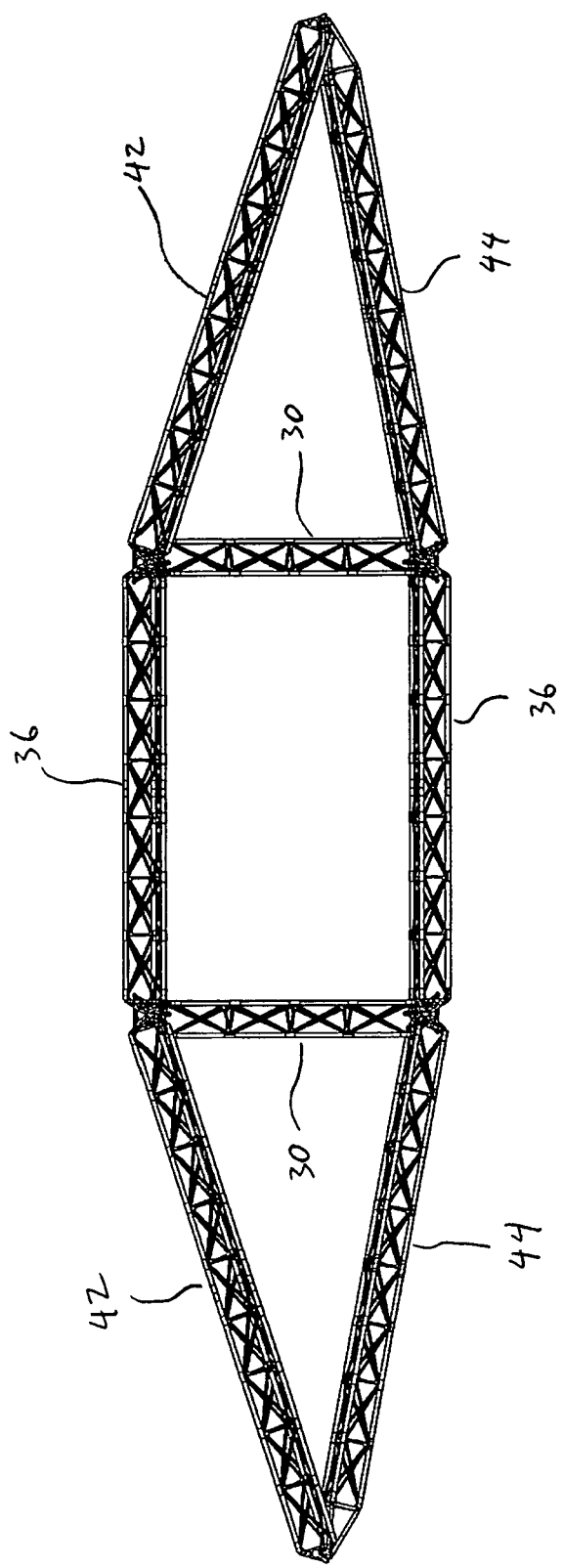
FIG. 11 is a side view of one side of the internal main frame of FIG. 6.
Figure 11A:
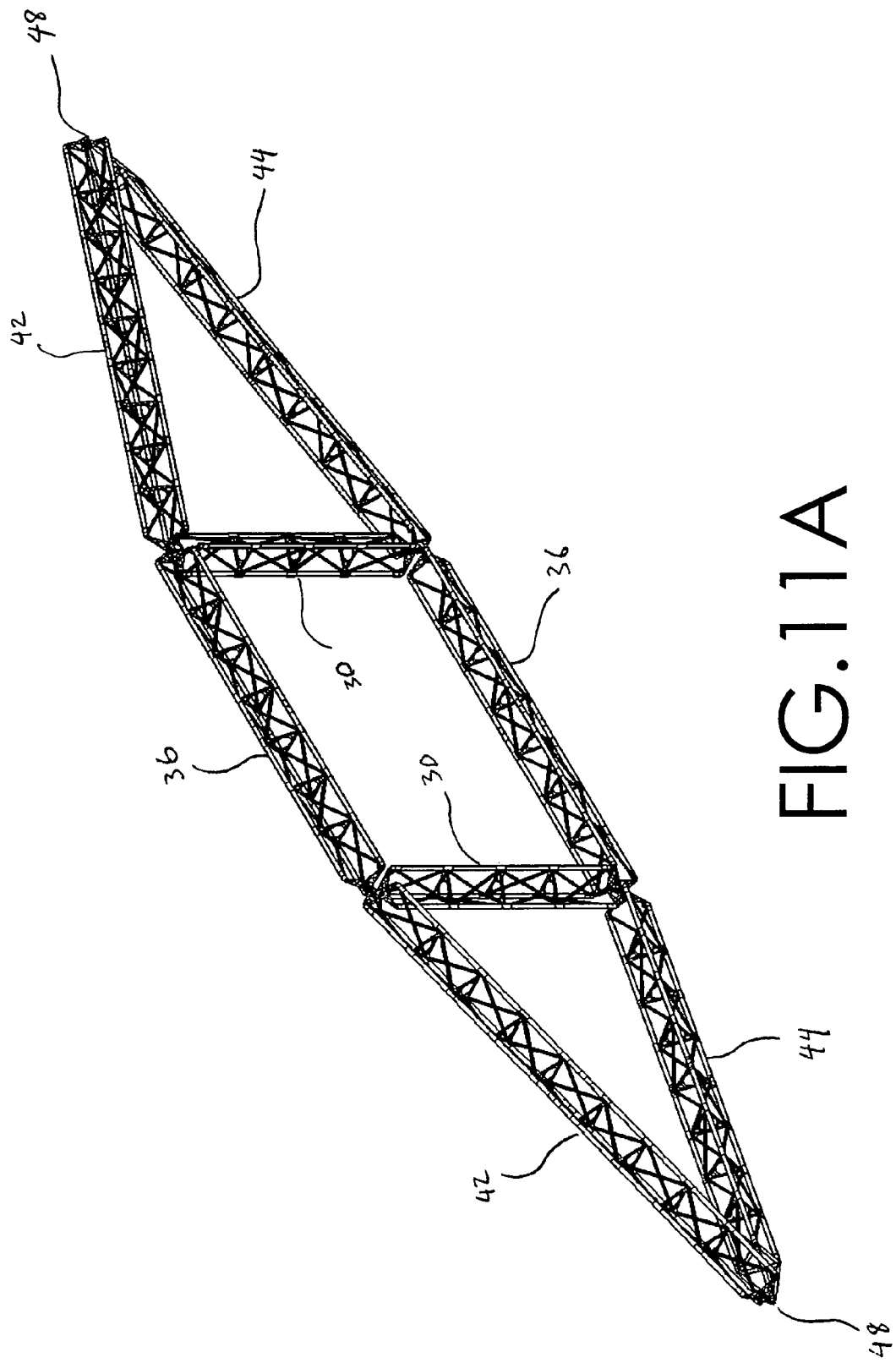
FIG. 11A is a side perspective view of one side of the internal main frame of FIG. 6.
Figure 12:
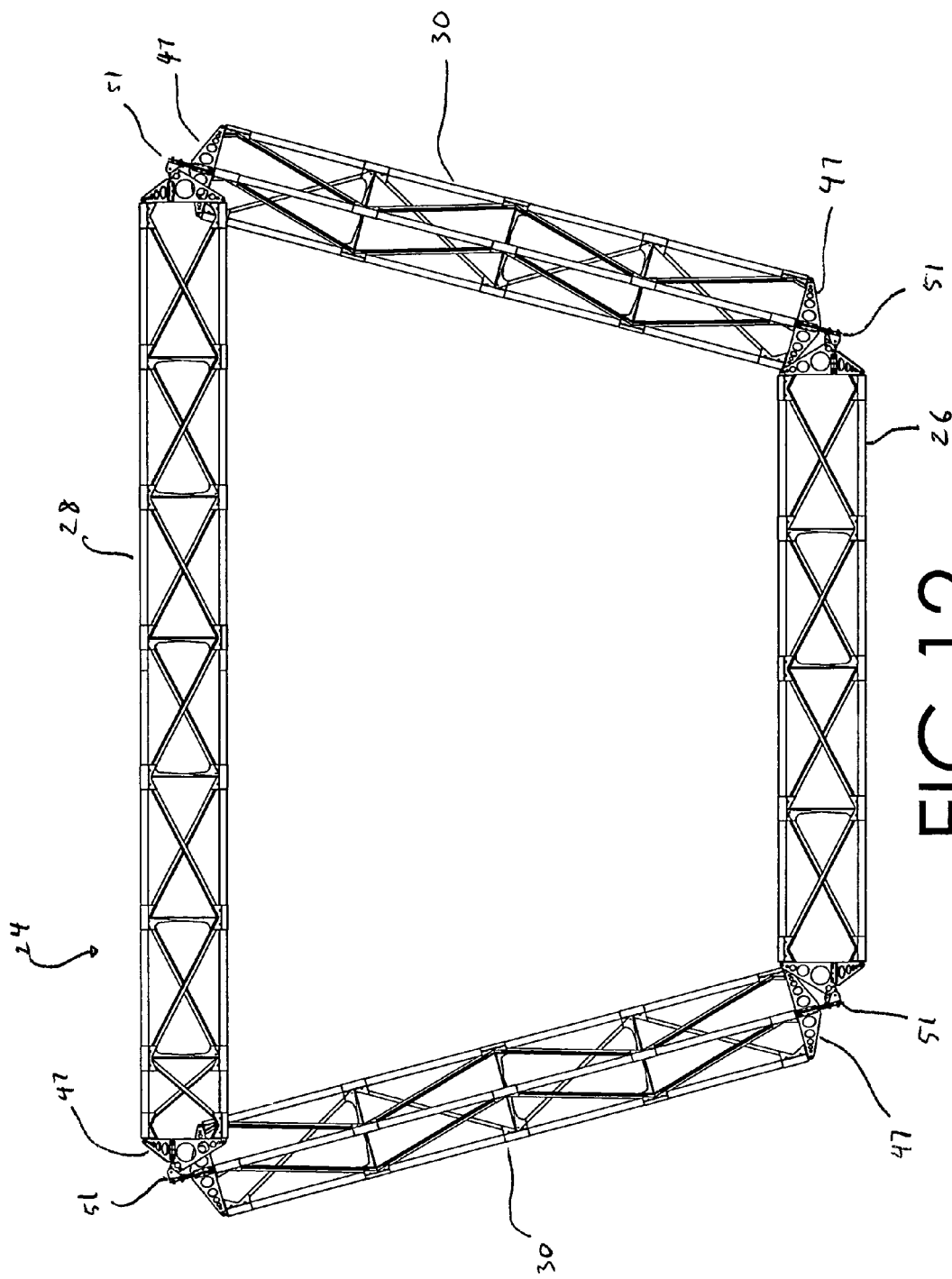
FIG. 12 is a view taken along the line C-C of FIG. 2 of a bulkhead assembly of the internal frame of FIG. 2 showing the profile of the bulkheads.

Referring now to FIGS. 6 and 11-12, in the exemplary embodiment, the internal main frame 12 is symmetrical about its longitudinal axis. The internal main frame 12 comprises two bulkheads 24 spaced apart longitudinally along the main frame's longitudinal axis. Each bulkhead includes upper and lower transverse trusses assemblies 28 and 26, respectively which are joined to right and left vertical truss assemblies 30 at corner joints 34 (best shown in FIG. 14). A box like structure is formed between the bulkheads by four interconnecting longitudinal truss assemblies 36, which connect to the bulk heads at corner joints 34. The fore and aft sections of the internal main frame 38 and 40, respectively are symmetrical and comprise upper diagonal truss assemblies 42 and lower diagonally truss assemblies 44. Connected between the diagonals 42 and 44 at the fore and aft ends of the frame are transverse end truss assemblies 46. The upper and lower diagonals 42 and 44 and the transverse end truss assemblies 46 connect at corner joints 48 (best shown in FIG. 13).

Figure 13:
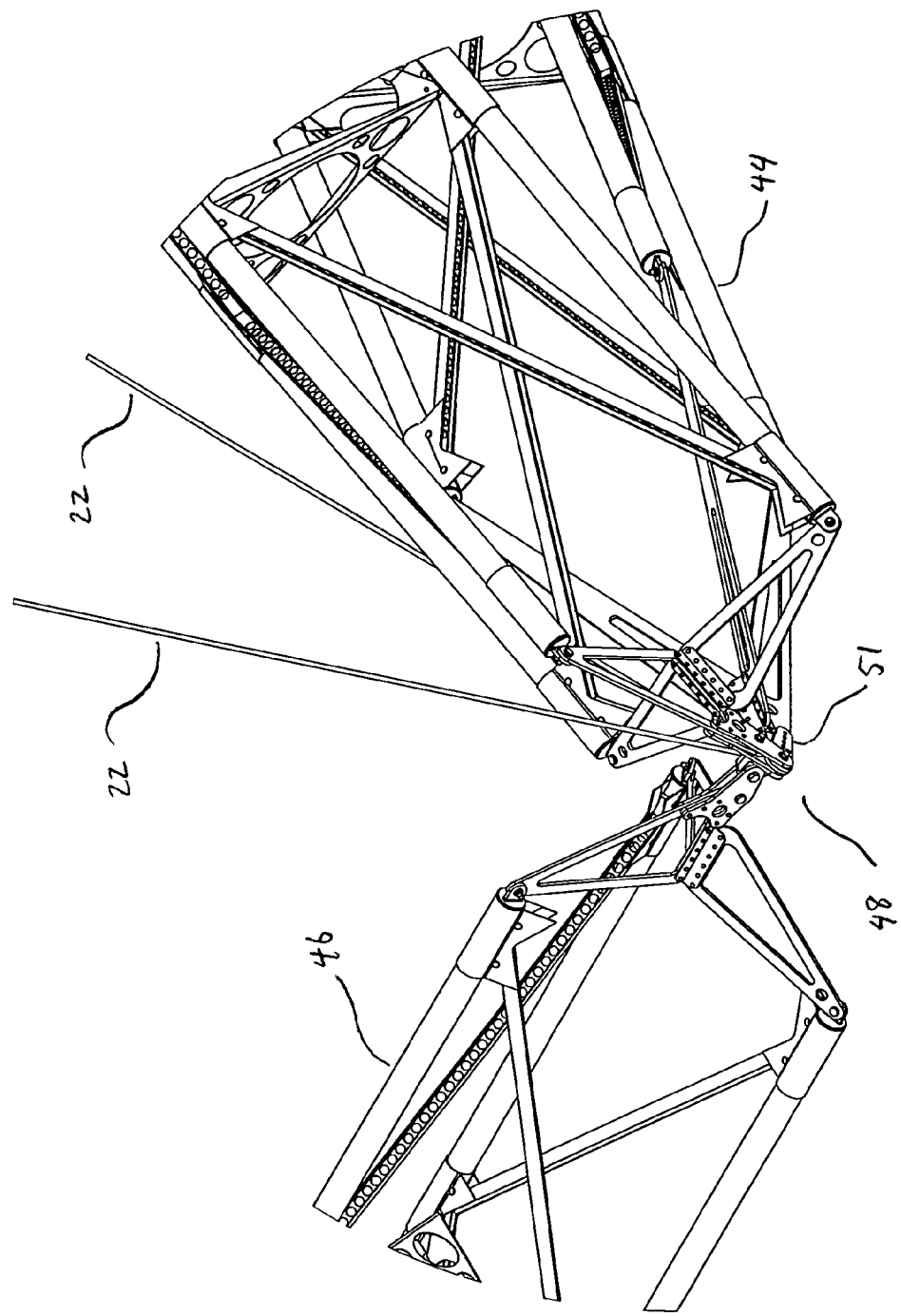
FIG. 13 is a detail perspective view taken about circle "A" of the main frame of FIG. 6, showing a typical corner joint connecting the longitudinal and lateral truss tube assemblies of the main frame at each fore and aft end corner.
Figure 14:
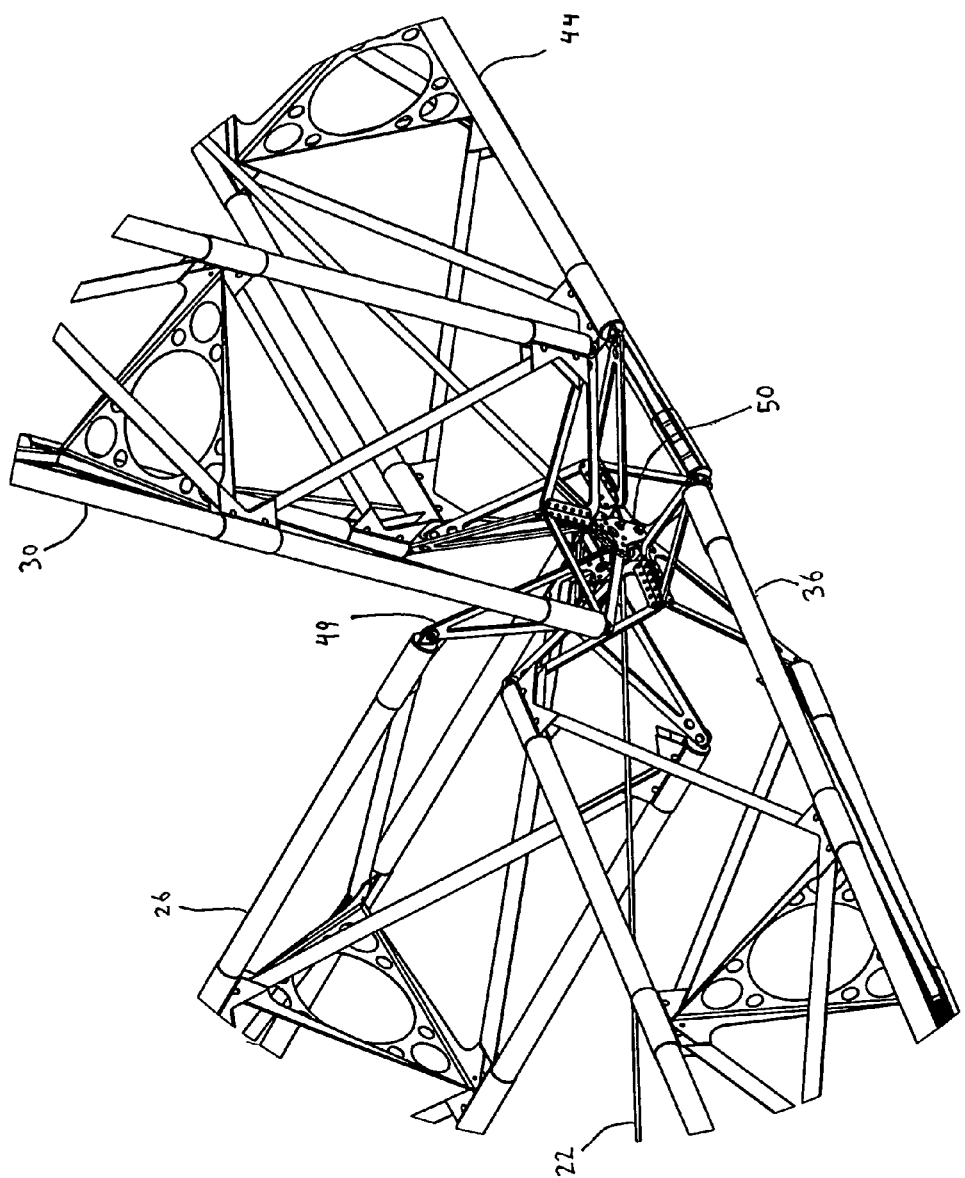
FIG. 14 is a detail perspective view taken about circle "B" of the main frame of FIG. 6, of a typical corner joint showing how the longitudinal truss tube assemblies and lateral truss tube assemblies of the bulkheads of the main frame interconnect.

FIGS. 13 and 14 show the interconnections of the truss assemblies at corner points 48 and 34 respectively. With reference to FIG. 14, a corner joint 34 is shown. Each truss assembly 26, 30, 36, and 33 is terminated with a triangular fitting 49. The corner joint 34 interconnects the bulkhead truss assemblies 26 and 30, the longitudinal box truss assembly 36 and the lower diagonal truss assembly 44 via the fittings 49 to central fitting 50. The fitting 50 allows for simple nut and bolt attachment of the multiple truss tube assemblies at essentially one common point. The use of a standardized fitting at each of the corner joints 34 allows for relative ease of assembly of the main frame 12. Likewise, FIG. 13 shows the end joint 48 of the internal main frame where the upper and lower diagonals 42 and 44 and the transverse end truss 46 assemblies connect at a single point via a fitting 51. The truss tubes 52 of truss assemblies 42, 44 and 46 terminate in triangular fittings 47 which connect to fitting 51. Again the use of a standardized fitting 51 which connects standardized truss assemblies via a simple bolted joint substantially enhances the ease of assembly of the internal main frame. In the exemplary embodiment, the fittings 49, 50 and 51 are machined from aluminum.

To re-enforce the stability of the frame, cables are used throughout the structure. This method allows for a greater reduction of weight in the airship frame as compared to using additional rigid structural members. As shown in FIG. 6, tension cables 22 diagonally interconnect each opposing corner joint (34 and 48) throughout the internal main frame 12. The cables are tensioned by means of a turnbuckle assembly 23. One turnbuckle assembly 23 is included with each cable 22. The cables 22 when properly tensioned to a predetermined load increase the rigidity and stiffness of the internal main frame 12. In the exemplary embodiment, the tension cables 22 are made from high strength steel cables. However, alternative materials such as aluminum or titanium cables or even low creep ropes are also suitable.

Standardized Lightweight Truss Assembly

Figure 8:
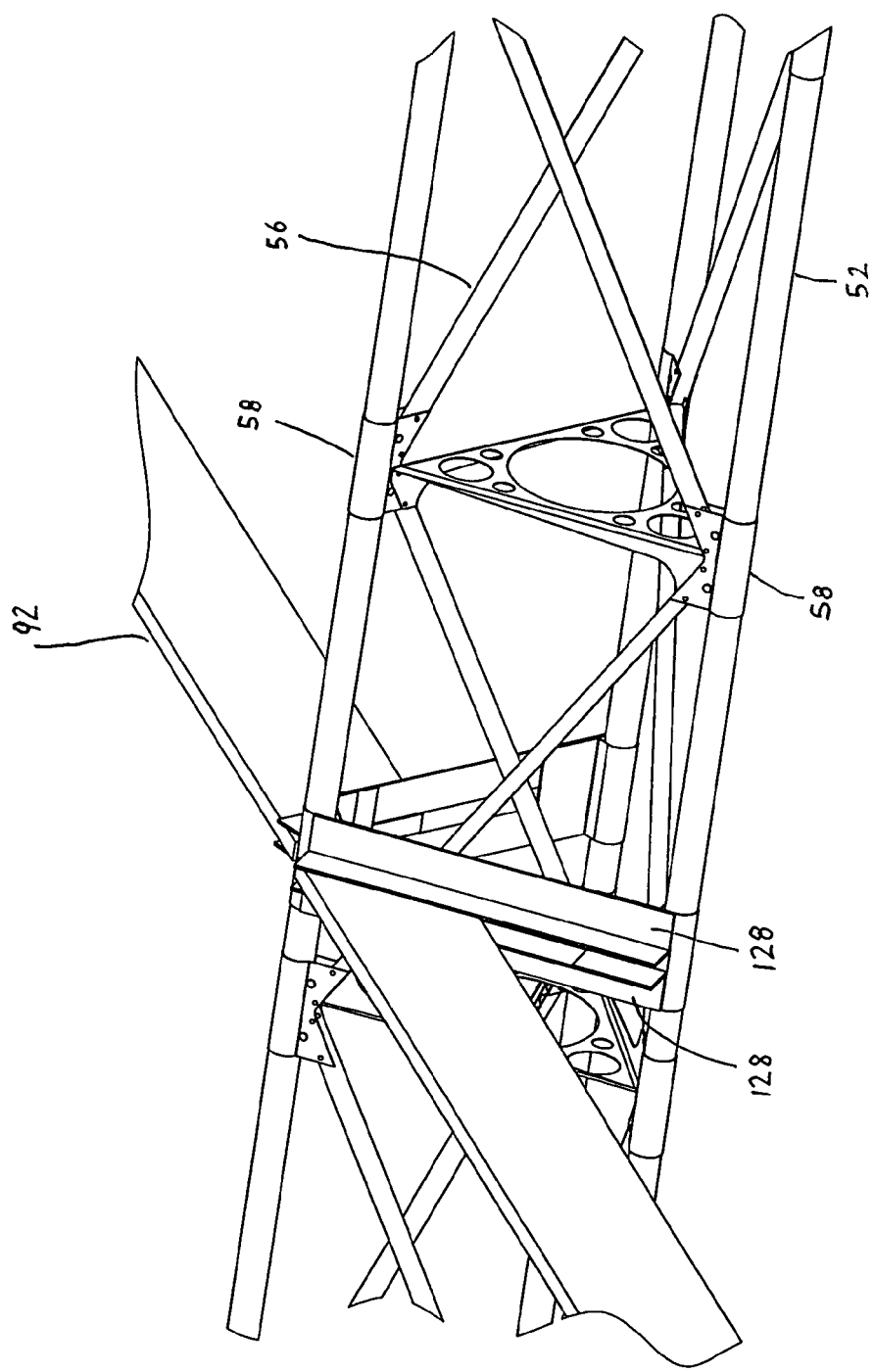
FIG. 8 is detail perspective view showing the truss tubes, triangular support plates, diagonal members, and connection fittings of the truss assembly of FIG. 7.
Figure 9:
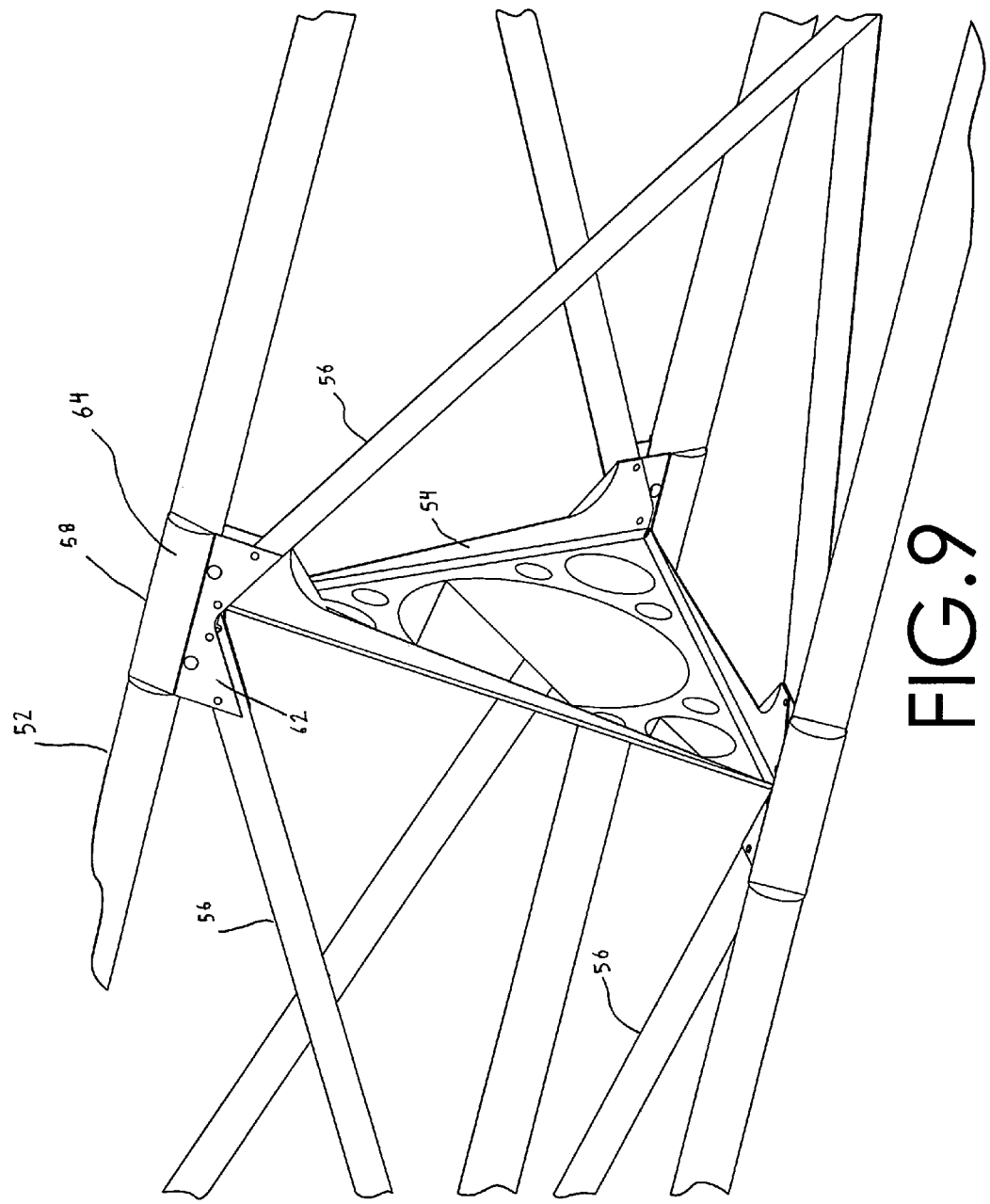
FIG. 9 is detail perspective view showing the interconnections between a truss tube, triangular support plate and diagonal member of the truss assembly of FIG. 7.

With reference to FIGS. 7-9, the structural configuration of the standardized truss assemblies 20 of the main frame 12 of the present invention airship hull 20 will be described. Each truss assembly includes three main tubes 52. In the exemplary embodiment, the tubes are made from carbon fiber composite. The tubes 52 are arranged that each tube is at one of the three apexes of a triangle. (In the exemplary embodiment, an equilateral triangle. Other geometric configuration may be substituted for the triangular arrangement.) Spaced along the length of the tubes are triangular plates 54. The triangular plates 54 include a mounting flange 55 and incorporate holes for weight reduction. (See FIG. 9.). Interconnecting with the tubes 52 and triangular plates 54 are diagonal stiffeners 56. Each stiffener runs from one corner point to its diagonal opposite in one of the equilateral planes formed by the triangular arrangement of the tubes. The stiffeners 56 are in the shape of I-beams and their webs incorporate spaced holes for weight reduction.

The axial tubes 52 of the truss tube assembly carry the longitudinal loads generated by bending moments and are the primary load carrying members. The triangular plates and lateral members are sized and spaced to prevent buckling of the axial tubes and to otherwise increase the stiffness and load capacity of the truss structure. The triangular plates 54 also provide convenient attachment points for other structures.

With reference to FIG. 9, a sleeve fitting 58 provides the connection between the tubes 52, triangular plate 54 and stiffeners 56. The fitting 58 includes a sleeve section 64 designed to be a slip fit with the tubes 52. The fitting also includes v-shaped flanges 62 which mate with the stiffeners 56. Upon assembly, the fitting 58 slides over the tubes 52 and is bonded into place via structural adhesive. The stiffeners 56 are likewise bonded into place in between the v-shaped flanges 62 of the fitting 58 using structural adhesive. Similarly, the mounting tabs 55 of the triangular plates 54 are bonded to an outside surface of the flange 62 of the fitting 58. The structural adhesive is intended to provide the primary load carrying connection between the above-mentioned parts. However, for added safety the triangular plate 54 and diagonal stiffeners 56 are riveted to the fitting 58 with rivets 62. Clamping pressure of the sleeve portion 64 of the fitting 58 about the tubes 52 is also maintained by rivets. (Best shown in FIG. 9.) In the exemplary embodiment, the triangular plates 54, stiffeners 56, and sleeve fittings 58 are made from aluminum.

With reference now to FIG. 14, the free ends of each truss tube 52 are terminated with a sleeve fitting 70. The sleeve fitting 70 includes a clevis fitting 72. The clevis fittings 72 connect the free ends of the truss tubes to a triangular fitting 49 which terminates each truss assembly. Each truss assembly is connected to a bulkhead joint fitting 50 via the triangular fittings 49. At each bulkhead joint fitting, four truss assemblies, i.e., nos. 26, 36, 30, and 44 intersect at the joint fitting 50. The goal of the joint fitting 50 is allow the neutral axes of each of the truss assemblies to intersect (ideally) at a single point. The specific design of the bulkhead joint fitting 50 is not overly important so long as the neutral axes of the connecting truss assemblies 20 intersect approximately at a single point.

With reference to FIG. 13, here again the neutral axes of the truss assemblies which form the fore and aft sections of the main frame ideally intersect at approximately a single point via attachment to a frame joint end fitting 51. The means of interconnection is similar to that of the bulkhead joint fitting, i.e. the truss tube assemblies terminate in triangular fittings 49 which connect to the frame joint end fitting 51. Frame joint end fitting 51 differs from that of fitting 50 because only three truss assemblies must be joined.

Frame and Truss Materials

In the exemplary embodiment described above, all materials and design configurations referenced refer to the prototype of the present invention airship hull built by Aeros Aeronautical Systems Corp. The prototype airship hull is presently undergoing static testing at Aeros Aeronautical Systems Corp.'s Montebello, Calif. facility. Because the existing design is a prototype, ease of machining and commercial availability of the materials were factors in material choices. As will be discussed below other material choices are possible and such alternatives may prove superior for use in volume production or for specialized applications such as military vehicles.

In exemplary embodiment, the truss tubes are described as being made from carbon fiber. Carbon fiber was chosen for use in the prototype for its high strength to weight ratio. No particular ply or resin composition is specified because many such combinations are suitable and are known to those of skill in the materials art. Other lightweight materials such as glass and boron fiber composites, and thin wall aluminum, titanium or steel tubing are also suitable for use in the truss tubes. Certain types of lightweight high strength wood may also prove suitable.

Throughout the prototype, most fittings are machined from billet aluminum of which several alloys are suitable. Other materials such as composites, titanium and steel, however, are also suitable. The fittings need not be machined from billet, but may also be produced from castings or forgings. The fittings are also not limited to being fabricated from metallic materials. The fittings may also be produced from molds using engineering plastics, or produced using graphite composites and like materials. Fiberglass may also be suitable.

The internal main frame design is not intended to be limited to any particular choice of materials or particular method of fabrication.

Aeroshell Frame

Referring now to FIG. 3, the Aeroshell frame 14 defines the outer shape of the vehicle and is structurally responsible for carrying aerodynamic loads. The Aeroshell frame comprises a plurality of formers 90, a plurality of transverse ribs 92 of approximately ellipsoidal shape, and a plurality of longitudinal members or longerons 94. The cross section of the aeroshell 14 along the longitudinal axis of the structure displays approximately elliptical geometry. Aerodynamic modeling has shown that this shape reduces flow separation and minimizes drag while maximizing aerodynamic lift.

Figure 15:
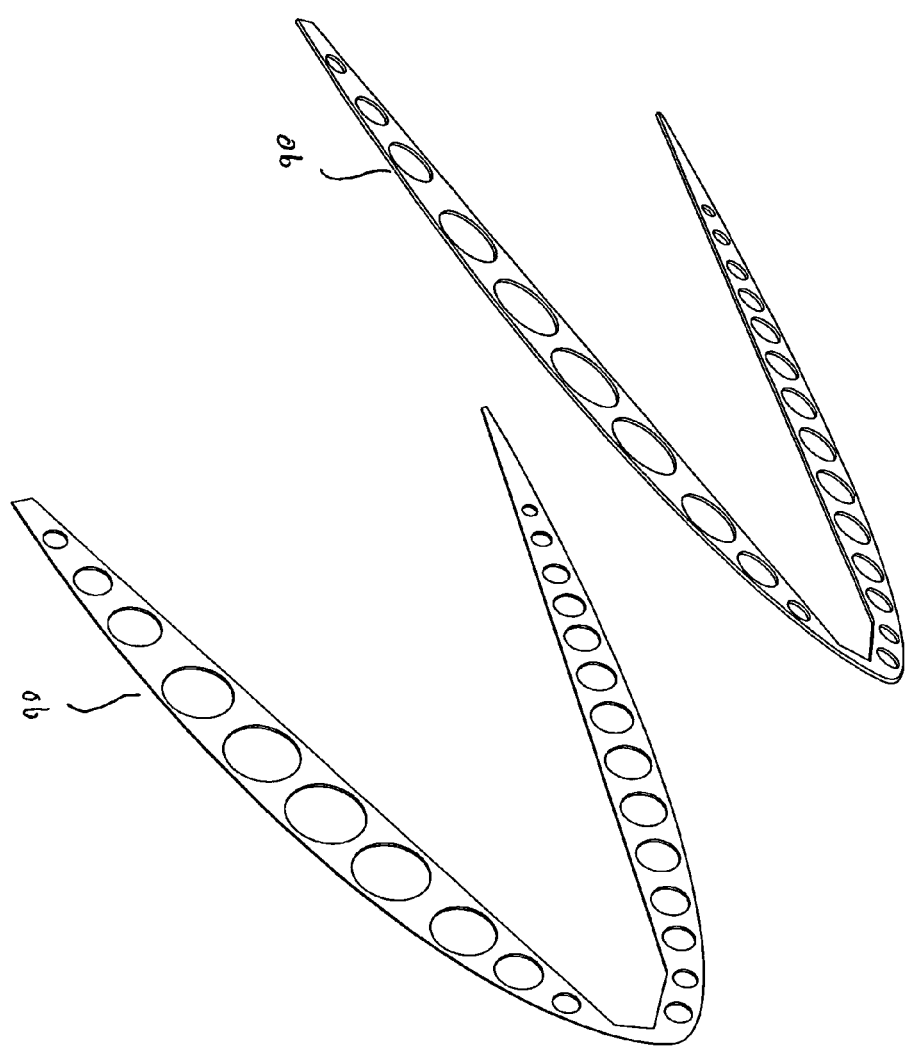
FIG. 15 is a detail perspective view of the longitudinal formers of the aeroshell frame of the airship hull of FIG. 1.
Figure 15A:
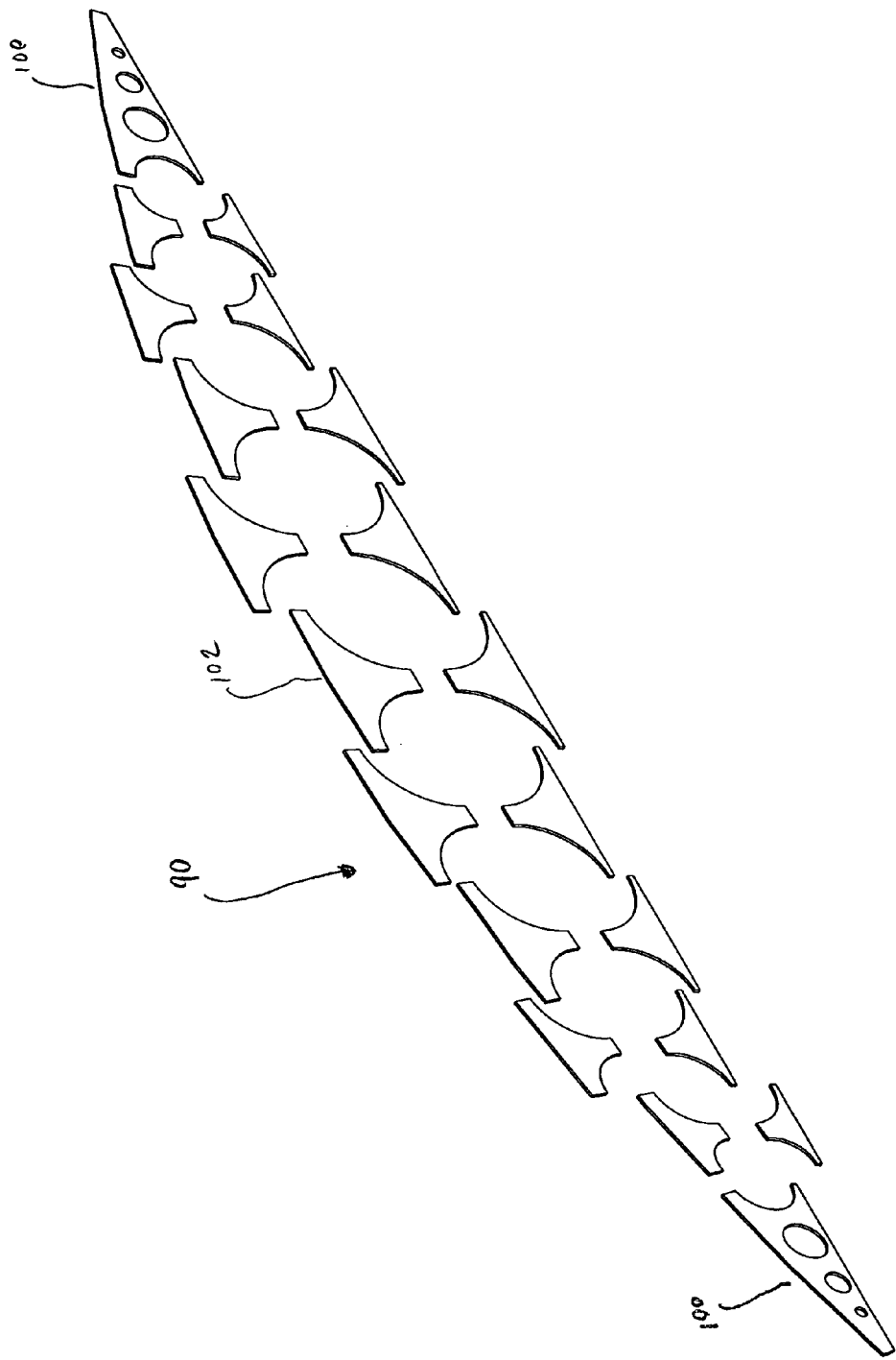
FIG. 15A is shows an exploded view of the individual sections of the longitudinal formers of FIG. 15
Figure 17:
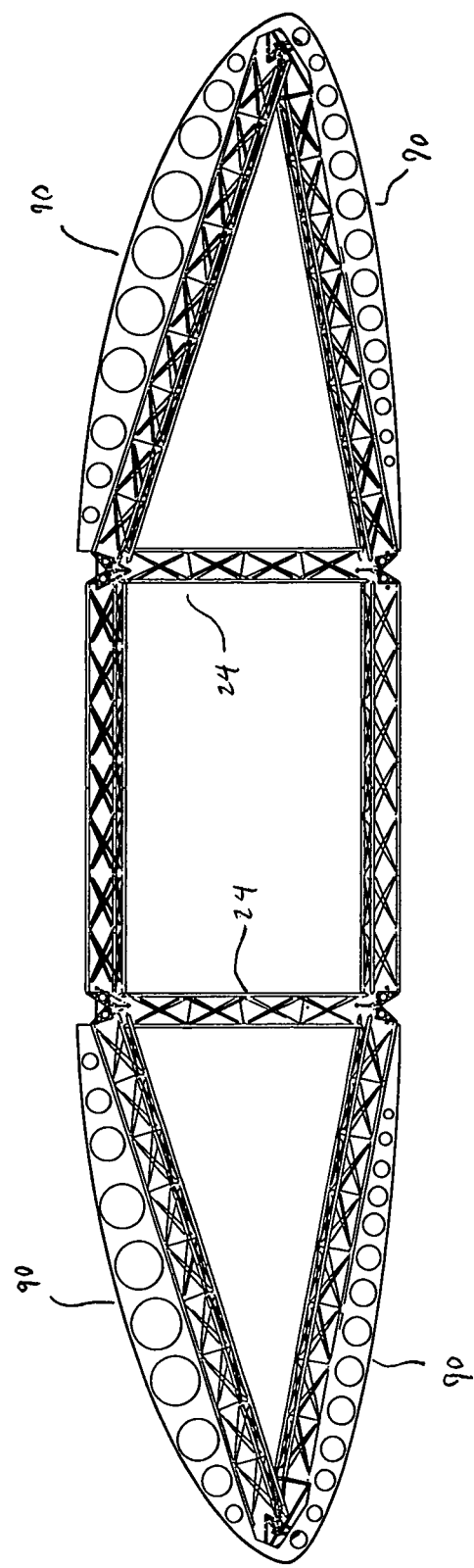
FIG. 17 is a side view of the main frame of the airship hull of FIG. 16, showing the aeroshell formers in place.
Figure 18:
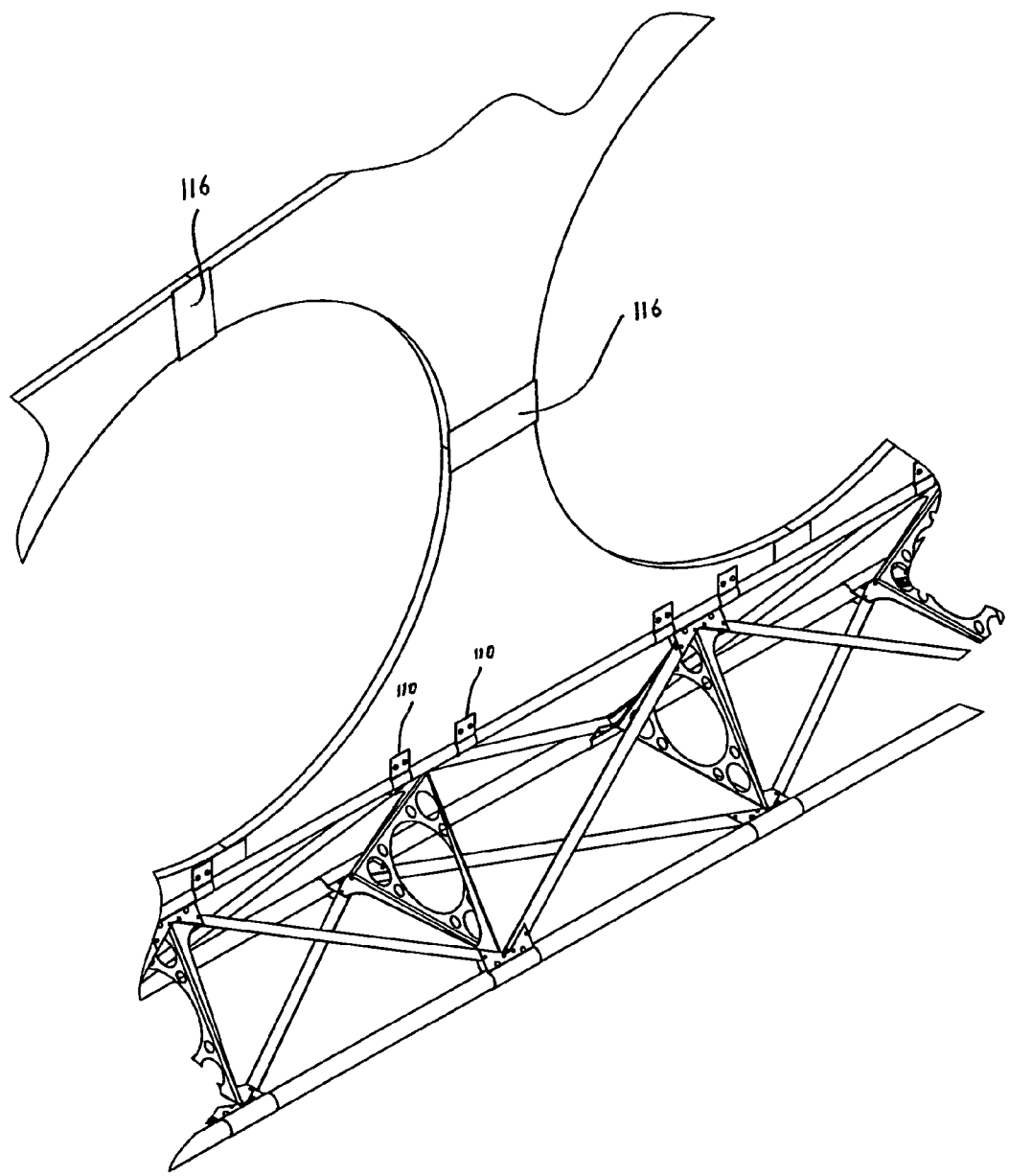
FIG. 18 is a view depicting the aeroshell former attachment to the main frame of FIG. 6.
Figure 19:
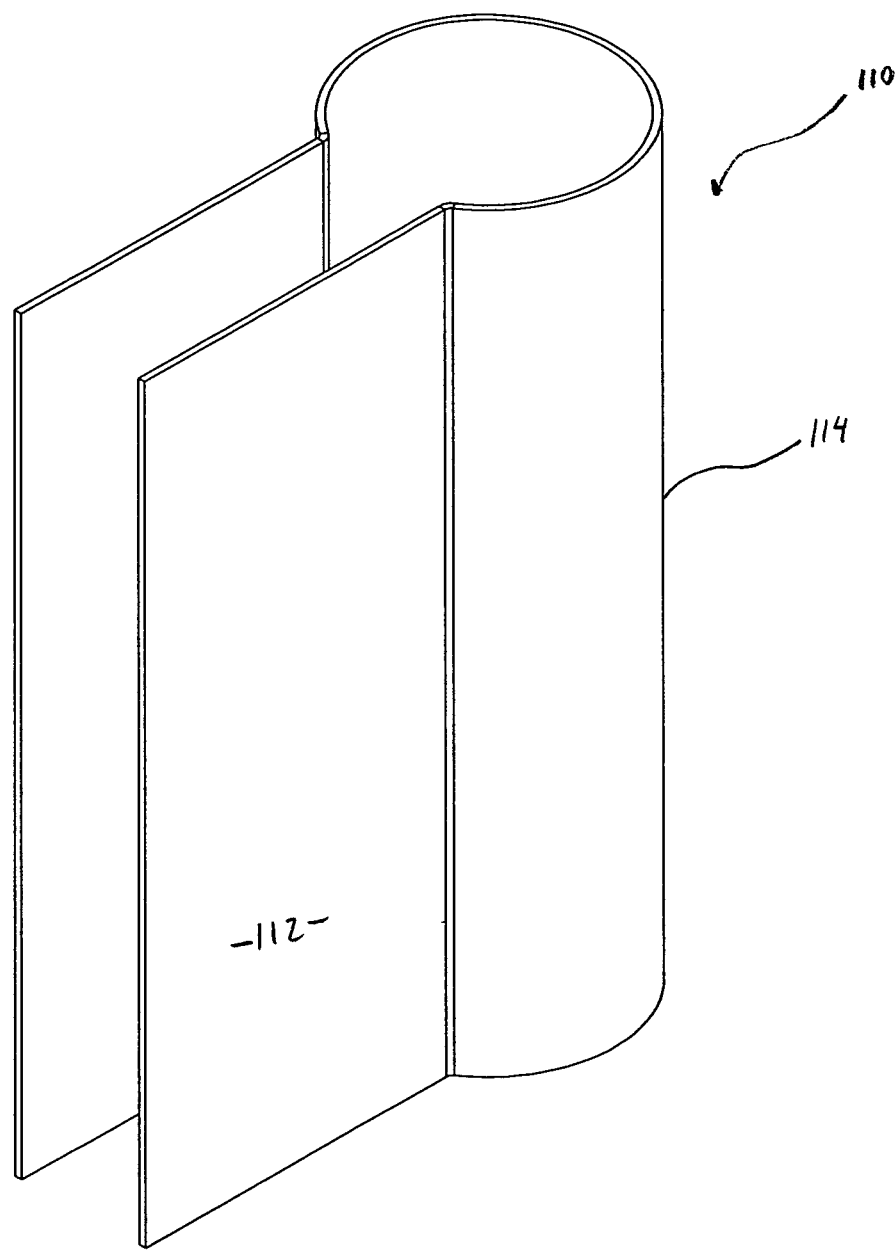
FIG. 19 is detail view of the fitting used to attach the aeroshell formers to the truss tubes of the main frame of FIG. 6.
Figure 23:
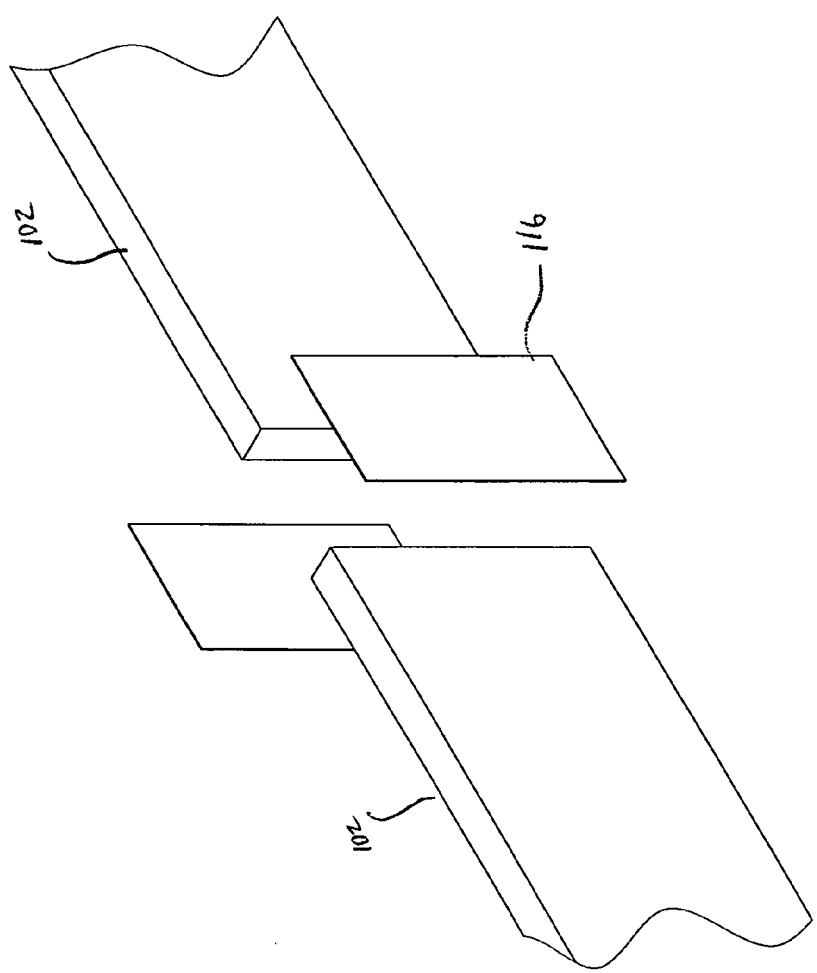
FIG. 23 is a detail view of a typical lap joint which joint sections of the oval ribs and/or sections of the longitudinal members of aeroshell of FIG. 3.

Referring now to FIGS. 15-19, the aeroshell formers are shown. The formers 90 define the fore and aft shape of the aeroshell. As shown in FIGS. 16-17, the formers 90 run longitudinally outwardly from the main frame bulkheads 24 to the ends of the main frame 12. In the exemplary embodiment, each former 90 comprises multiple separate sections (see FIG. 15A) cut from an aluminum honeycomb composite panel, i.e., a nose or end sections 100 and a plurality of intermediate sections 102. (See FIGS. 15A and 18). The multiple sections which comprise the formers 90 are joined together via doublers 116 in a lap joint configuration using structural adhesive. (See FIG. 23.) The formers 90 are attached to the main frame 14 along the outward most truss tube 52 of the truss assemblies 42 and 44 via a plurality of sleeve fittings 110. The sleeve fittings 110 comprise a sleeve portion 114 and a flange portion 112. The sleeve portion of the fitting 110 is adhesively bonded to the graphite tubes 52 and flange portion is likewise bonded to the former 90. The flange portion 112 of the fitting may be also be attached to the formers 90 using rivets or a combination of structural adhesive and rivets, if desired. The formers can be replaced with composite tubes or other alloys with clevis or like fittings.

Figure 20:
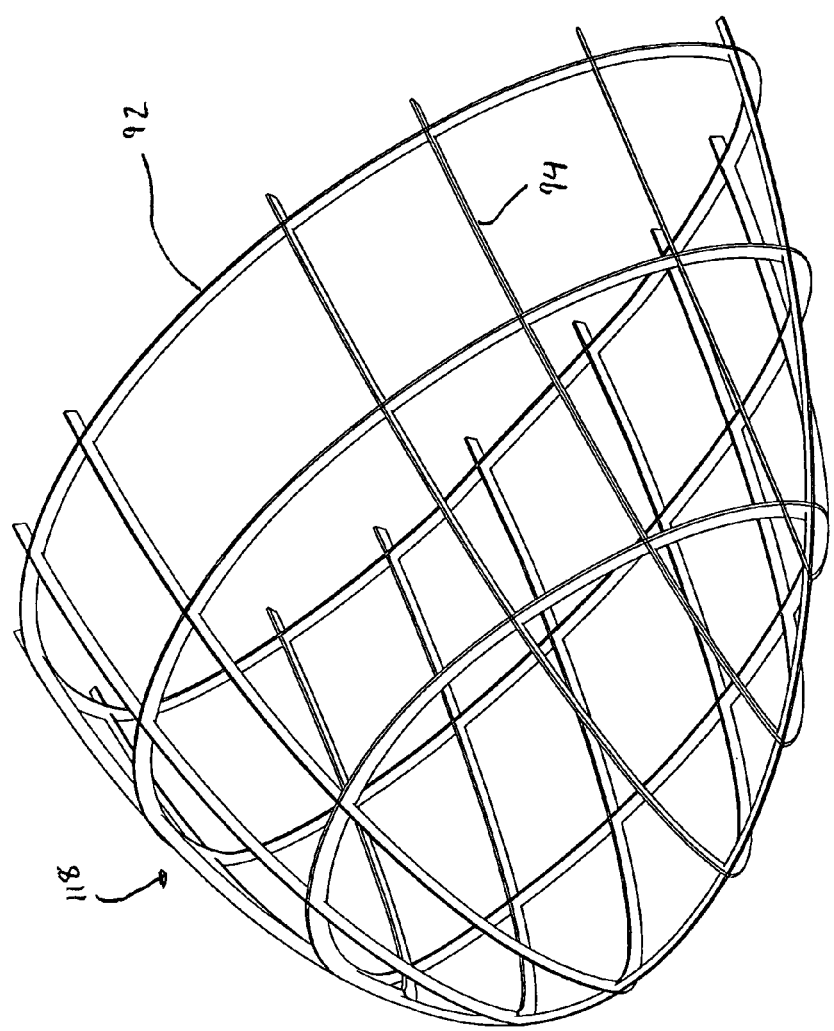
FIG. 20 is a perspective view of the ribs and longitudinal members of the forward section of the aeroshell frame of FIG. 3.
Figure 21:
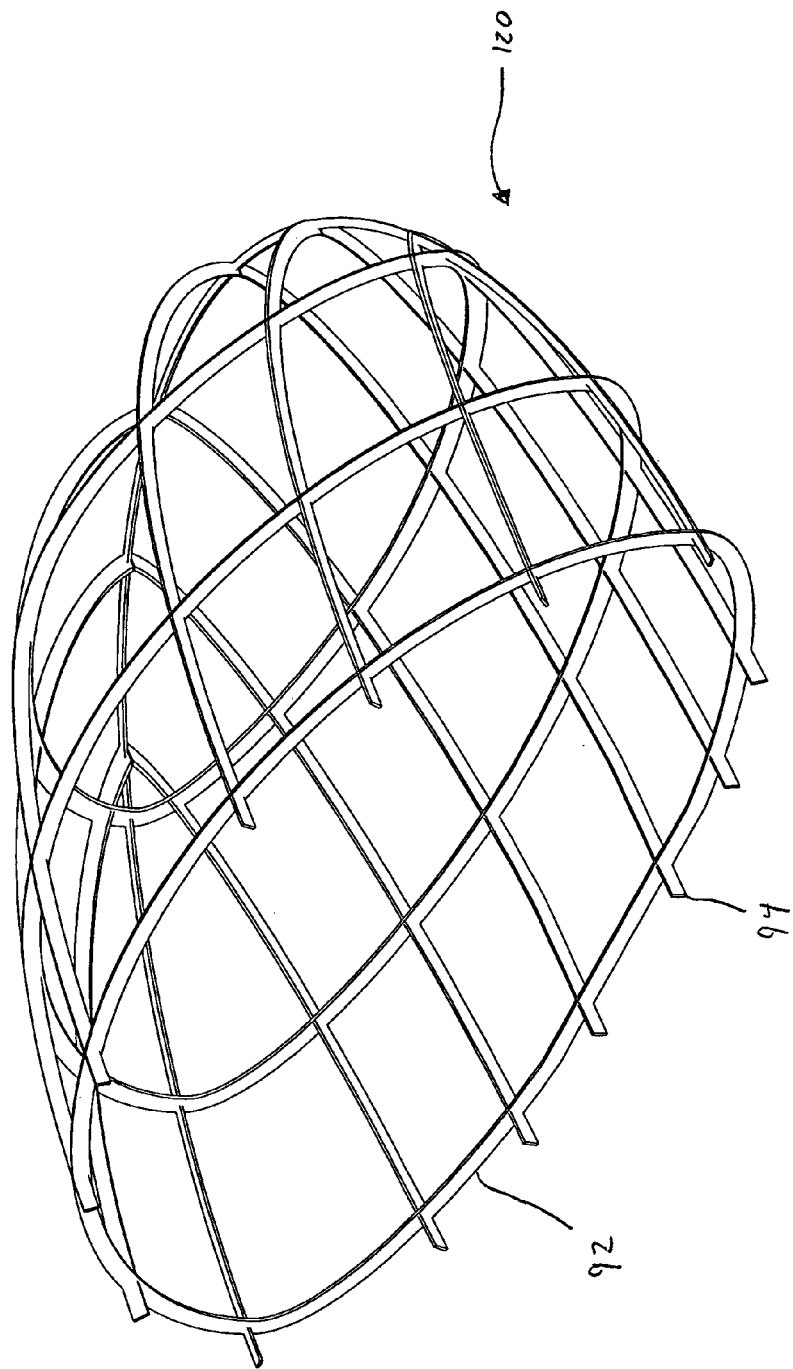
FIG. 21 is a perspective view of the ribs and longitudinal members of the aft section of the aeroshell frame of FIG. 3.
Figure 22:
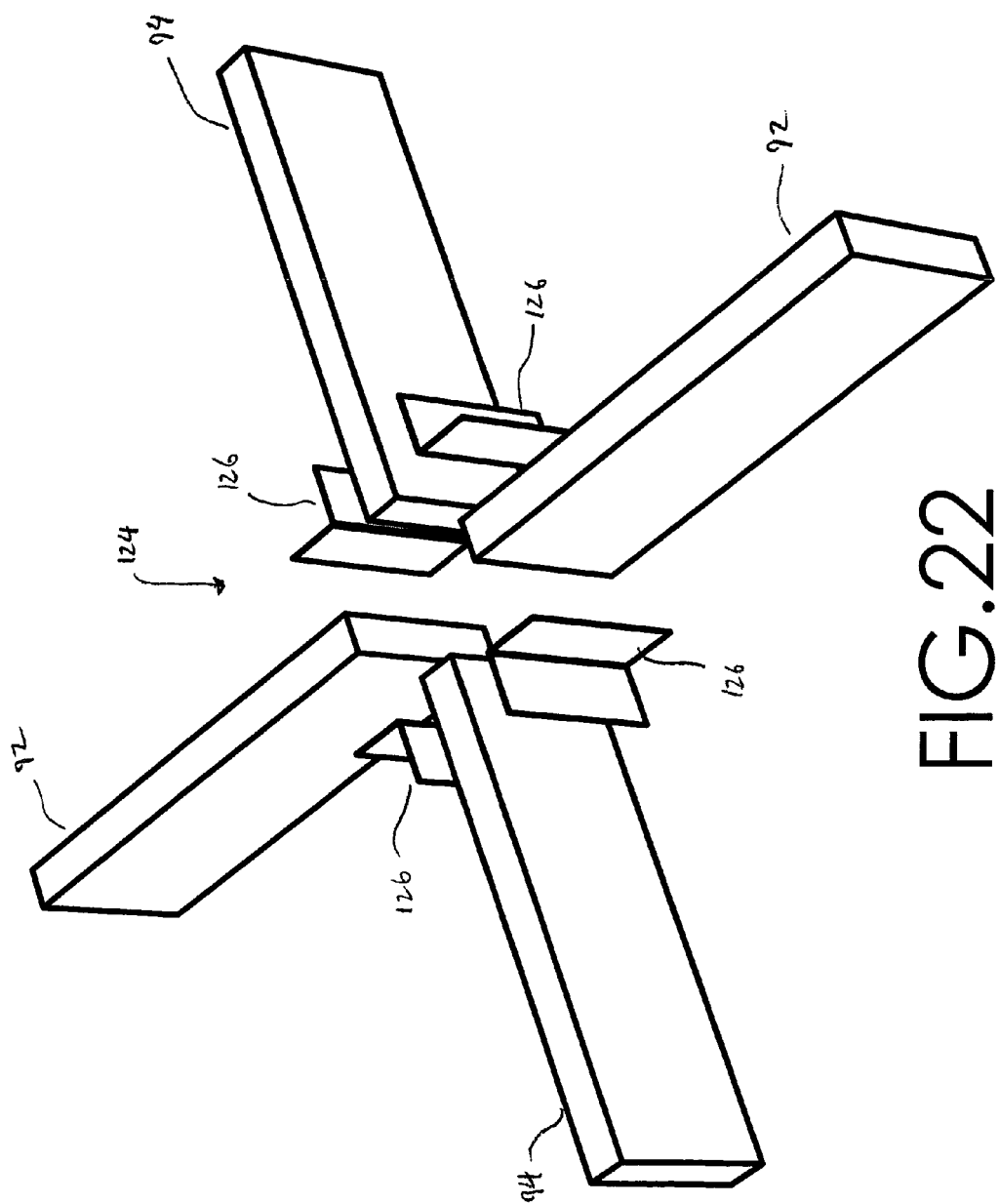
FIG. 22 is a detail view of a typical but-joint interconnecting the oval rib sections and longitudinal members of aeroshell of FIG. 3.

With reference to FIGS. 3, 20 and 21, the ribs 92 and longerons 94 of the aeroshell frame 14 are also fabricated from aluminum honey comb composite panels. The ribs and longerons may conceptually be thought of as forming three sections, i.e., the forward section 118, the aft section 120 and a center section 122 between the main frame bulkheads 24. The ribs and longerons which make up the aeroshell are joined at each intersection by butt-joints 124. (See FIG. 22.) Each butt joint 124 uses four aluminum angle sections 126 to form the joint. The angle sections 126 are joined to the ribs 92 and longerons 94 by structural adhesive. The joints may optionally be reinforced with rivets for additional safety. The ribs and longerons which comprise the forward 118 and aft 120 portions of the aeroshell are also attached to the formers 90 using but-joints 124 comprising angle sections 126.

As stated, the formers 90, ribs 92, and longerons 94 are cut from sheets of honeycomb sandwich composite. In the exemplary, embodiment, the honeycomb composite panels have a hexagonal cell core of approximately 1" thickness with face sheets of approximately 0.010" thickness. The face sheets and core are made from aluminum or other lightweight material. The ribs 92 and longerons 94 have a rectangular cross sections of variable thickness by one inch in depth. The formers 90 are of variable depth and also include a plurality of circular cutouts to reduce weight. Alternative honeycomb-type composites using cores and facesheets composed of other metallic or non-metallic materials such as titanium, graphite composites, carbon fiber and engineering plastics are also suitable.

Referring to now to FIGS. 3 and 8, the aeroshell ribs between the bulkheads 24 of the main frame 14 attach directly to the longitudinal trusses 36 via angle sections 128 and structural adhesive. As shown in FIG. 8, the rib 92 is v-notched so as to fit over the outermost truss tube 52 and sleeve fitting 58. Four angle sections 128 are used. The angle sections 128 are bonded to the flanges 62 of the sleeve fitting 58 at their upper and lower ends and to the sides of ribs 92.

Aeroshell Skin

The desired characteristics for the skin 16 are a high strength-to-weight ratio; the ability to serve as a lifting gas barrier; the ability to withstand environmental conditions such as extremes of temperature, moisture, and ultraviolet radiation, optionally. Ideally, the skin would also be of low cost to manufacture.

Several materials or combinations of materials could be used to achieve a skin having the above-mentioned characteristics. With reference to FIG. 24 in the exemplary embodiment, the skin comprises a multilayer composite of six layers. The outermost layer 130 is composed of Tedlar (available from the DuPont Corporation). The next layers (132 and 134) are composed of pre-impregnated fiberglass composite. The fourth layer 136 is Mylar, a polymer film, (available from the DuPont Teijin Films Worldwide) which serves as the lifting gas barrier. The final layers (138 and 140) are composed of fiberglass composite.

With regard to the outer layer, Tedlar provides ultraviolet light protection and also serves as a secondary barrier for containing the lifting gas. Additionally, Tedlar is well suited for use as the external surface of the skin because it is available in a number of bright colors and has desirable gloss and texture that is pleasing to the eye and therefore eliminates the need to paint the skin which saves hundreds of pounds in weight. The fiberglass cloth used in the fiberglass layers is of a bi-axial weave. No particular fiberglass composite weave or ply orientation is specified because various other weaves or ply orientations that achieve quasi-isotropic properties, for example zero degree or 45 degree angle orientations, are suitable and known to those of skill in the aeroshell skin art. The internal layer of Mylar provides the principal harrier for containment of the lifting gas.

Figure 10:
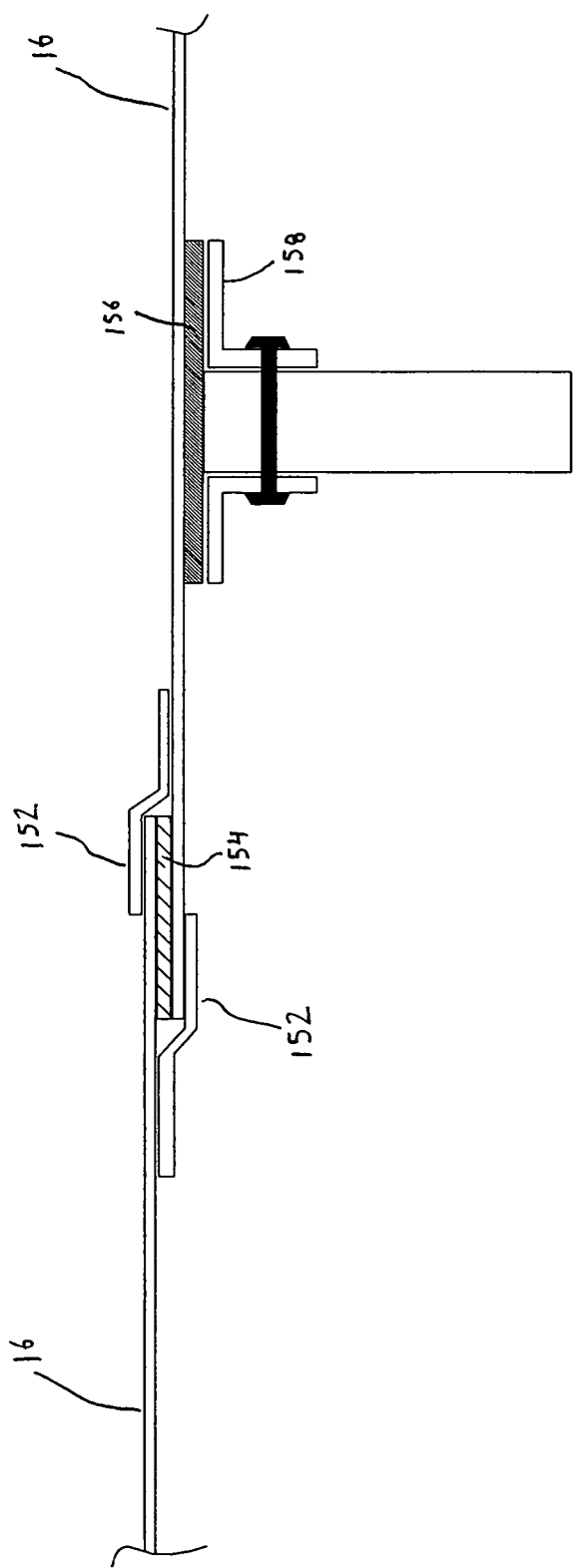
FIG. 10 is a partial section view of the skin of the airship hull of FIG. 1 showing two skin sections joined by doublers. Also shown is a skin to rib frame or longitudinal member attachment.

Referring now to FIG. 4, the skin 16 of the exemplary embodiment is divided into four sections, i.e., sections 142, 144, 146, and 148, for ease of assembly. With reference to FIG. 10, the various skin sections are joined and sealed by the use of structural adhesive 152 in a lap joint configuration of the skin 16 with inner and outer doublers 150 and 152.

Referring now to FIG. 10, the skin is attached at a plurality of spaced apart locations on the ribs 92 and longerons 94 of the aeroshell frame. The attachments are made via aluminum interconnections 158 and pressure sensitive tape 156, i.e., double sided pressure sensitive tape is used to attach the aluminum interconnections 158 to the skin 16. The aluminum interconnections themselves are attached to the ribs 92 or longerons 94 via structural adhesive and rivets.

The foregoing detailed description and appended drawings are intended as a description of the prototype embodiment of the invention and are not intended to represent the only forms in which the present invention may be constructed and/or utilized. Those skilled in the art will understand that present invention airship hull may be scaled up or down as desired. The prototype embodiment used only two bulkheads, however larger craft using a plurality of bulkheads are possible and are presently under design at Worldwide Aeros Corp. Modifications and alternative embodiments of the present invention which do not depart from the spirit and scope of the foregoing specification and drawings, and of the claims appended below are possible and practical. It is intended that the claims cover all such modifications and alternative embodiments.

What is claimed is:

1. A light weight hull for a rigid airship comprising:
an internal main frame for carrying bending moment and structural loads, the internal main frame having a longitudinal axis and comprising a center section, a fore section and an aft section;
wherein the center section comprises at least two generally trapezoidal bulkheads oriented generally perpendicularly to the longitudinal axis, the at least two generally trapezoidal bulkheads being interconnected by longitudinal members, the longitudinal members being oriented generally parallel to the longitudinal axis;
wherein each of the at least two generally trapezoidal bulkheads is comprised of a plurality of modular truss assemblies;
wherein each of the modular truss assemblies of the at least two generally trapezoidal bulkheads comprises:
three main tubes arranged in a triangular configuration;
a plurality of triangular plates spaced along the three main tubes, wherein the triangular plates interconnect the main tubes; and
an external aeroshell attached to the main frame wherein the aeroshell carries aerodynamic loads induced on the hull, the aeroshell comprising,
an aeroshell frame, and outer skin.

2. The hull for a rigid airship of claim 1, wherein the external aeroshell attached to the main frame carries aerodynamic loads induced on the hull and carries loads induced by a lifting gas.

3. The hull for a rigid airship of claim 1, wherein the aeroshell is in the shape of a lifting body for the generation of aerodynamic lift.

4. The hull for a rigid airship of claim 1, wherein the aeroshell frame comprises a plurality of transverse members wherein the transverse members are of a generally ellipsoidal shape and a plurality of longitudinal members wherein the longitudinal members are of a generally ellipsoidal shape, the longitudinal and transverse members defining the outer shape of the vehicle, the outer shape being in the form of a lifting body.

5. The hull for a rigid airship of claim 1, wherein the aeroshell is connected to the internal main frame at the fore and aft ends of the main frame via formers, or composite tubes, disposed between the main frame and the aeroshell.

6. The hull for a rigid airship of claim 1, wherein the outer skin comprises a membrane sufficiently rigid to be self-supporting but that retains sufficient flexibility to accommodate hull deformation.

7. The hull for a rigid airship of claim 1, wherein the outer skin comprises a multi-layer composite including a layer of metallized polymer material; at least one layer of structural cloth, and at least one layer of lifting gas impermeable material.

8. The hull for a rigid airship of claim 1, wherein the at least two generally trapezoidal bulkheads of the center section are in the shape of isosceles trapezoids.

9. The hull for a rigid airship of claim 1, wherein each of the modular truss assemblies of the at least two generally trapezoidal bulkheads further includes at least one diagonal member, diagonally interconnecting each triangular plate in the modular truss assembly.

10. The hull for a rigid airship of claim 1, wherein a cross section of each of the modular truss assemblies is that of an equilateral triangle.

11. The hull for a rigid airship of claim 1, wherein at least one of a pair of diagonal connection points on each of the generally trapezoidal bulkheads is interconnected by a tension wire, located in a plane of the bulkheads.

12. The hull for a rigid airship of claim 1, wherein at least one of a pair one of diagonal connection points on adjacent generally trapezoidal bulkheads is interconnected by a tension wire, located in a plane of the longitudinal members.

13. A light weight hull for a rigid airship comprising:
an internal main frame for carrying bending moments and structural loads, the internal main frame having a longitudinal axis and a center section comprising at least two generally quadrilateral bulkheads oriented generally perpendicularly to the longitudinal axis, the at least two generally quadrilateral bulkheads being interconnected by longitudinal members, the longitudinal members being oriented generally parallel to the longitudinal axis;
the internal main frame further including fore and aft sections, wherein the fore section is connected to one of the at least two generally quadrilateral bulkheads and the aft section is connected to another of the at least two generally quadrilateral bulkheads;
wherein each of the at least two generally quadrilateral bulkheads is comprised of a plurality of truss assemblies;
wherein each of the plurality of truss assemblies of the at least two generally quadrilateral bulkheads comprises:
three main tubes arranged in a triangular configuration;
a plurality of triangular plates spaced along the three main tubes,
wherein the triangular plates interconnect the main tubes; and
an external aeroshell attached to the main frame, the aeroshell being a lifting body of generally ellipsoidal cross-section, wherein the aeroshell carries aerodynamic loads induced on the hull, the aeroshell comprising,
an aeroshell frame, and outer skin.

14. The hull for a rigid airship of claim 13, wherein the aeroshell frame comprises a plurality of ribs and longerons, the ribs and longerons defining the generally ellipsoidal cross-section of the vehicle.

15. The hull for a rigid airship of claim 13, wherein the aeroshell is connected to the internal main frame at the fore and aft ends of the main frame via formers or composite tubes, disposed between the internal main frame and the aeroshell.

16. The hull for a rigid airship of claim 13, wherein the formers supporting the aeroshell are made from a honeycomb panel sandwich composite.

17. The hull for a rigid airship of claim 13, wherein the outer skin is sufficiently rigid to be self-supporting yet sufficiently flexible to accommodate hull deformation.

18. The hull for a rigid airship of claim 13, wherein the external aeroshell in addition to carrying aerodynamic loads induced on the hull also carries loads induced by a lifting gas.

19. The hull for a rigid airship of claim 13, wherein the at least two generally quadrilateral bulkheads are generally trapezoidal in configuration.

20. The hull for a rigid airship of claim 13, wherein the at least two generally quadrilateral bulkheads are in the shape of isosceles trapezoids.

21. The hull for a rigid airship of claim 13, wherein each of the modular truss assemblies of the at least two generally quadrilateral bulkheads further includes at least one diagonal member, diagonally interconnecting each triangular plate in the modular truss assembly.

22. The hull for a rigid airship of claim 13, wherein a cross section of each of the modular truss assemblies is that of an equilateral triangle.

23. The hull for a rigid airship of claim 13, wherein at least one of a pair of diagonal connection points on each of the generally quadrilateral bulkheads is interconnected by a tension wire, located in a plane of the bulkheads.

24. The hull for a rigid airship of claim 13, wherein at least one of a pair of diagonal connection points on adjacent generally quadrilateral bulkheads is interconnected by a tension wire, located in a plane of the longitudinal members.

* * * * *